(12) United States Patent
Binder

(10) Patent No.: US 7,990,908 B2
(45) Date of Patent: Aug. 2, 2011

(54) ADDRESSABLE OUTLET, AND A NETWORK USING THE SAME

(75) Inventor: Yehuda Binder, Hod Hasharon (IL)

(73) Assignee: Mosaid Technologies Incorporated, Ottawa, Ontario (CA)

( * ) Notice: Subject to any disclaimer, the term of this patent is extended or adjusted under 35 U.S.C. 154(b) by 250 days.

(21) Appl. No.: 12/030,418

(22) Filed: Feb. 13, 2008

(65) Prior Publication Data
US 2008/0198777 A1 Aug. 21, 2008

Related U.S. Application Data

(63) Continuation of application No. 10/491,989, filed on Apr. 7, 2004, now Pat. No. 7,522,615, which is a continuation of application No. PCT/IL03/00948, filed on Nov. 12, 2003.

(30) Foreign Application Priority Data

Nov. 13, 2002 (IL) .......................................... 152824

(51) Int. Cl.
G06F 15/16 (2006.01)

(52) U.S. Cl. ....................................... 370/318; 370/401

(58) Field of Classification Search ............... 455/426.1, 455/574; 370/318, 352, 401, 412, 469
See application file for complete search history.

(56) References Cited

U.S. PATENT DOCUMENTS

| 2,411,786 A | 11/1946 | Halstead |
| 2,577,731 A | 12/1951 | Berger |
| 3,045,066 A | 7/1962 | Beuscher |
| 3,280,259 A | 10/1966 | Cotter |
| 3,334,340 A | 8/1967 | McConnell |
| 3,369,078 A | 2/1968 | Stradley |
| 3,590,271 A | 6/1971 | Peters |
| 3,699,523 A | 10/1972 | Percher |
| 3,702,460 A | 11/1972 | Blose |
| 3,717,858 A | 2/1973 | Hadden |
| 3,739,226 A | 6/1973 | Seiter |
| 3,771,069 A | 11/1973 | Levacher et al. |
| 3,796,920 A | 3/1974 | Hedrick et al. |
| 3,805,265 A | 4/1974 | Lester |

(Continued)

FOREIGN PATENT DOCUMENTS

EP 0 200 016 A2 11/1986

(Continued)

OTHER PUBLICATIONS

Universal Serial Bus Specification—Rev. 1.0, Jan. 15, 1996; Sec. 4.2.1 pp. 29-30.

(Continued)

*Primary Examiner* — Sam Bhattacharya
(74) *Attorney, Agent, or Firm* — Browdy and Neimark, PLLC

(57) ABSTRACT

An addressable outlet for use as part of local area network based on wiring installed in a building, such as telephone, electrical, cable television, dedicated wiring, and the like. The use of such wiring for data communications networks in addition to the wiring's primary usage creates a need for ways of determining the condition of the network and monitoring this information remotely. Network condition includes such factors as continuity of wiring, connector status, connected devices, topology, signal delays, latencies, and routing patterns. Providing basic processing and addressing capabilities within the outlet permits messaging to and from specific individual outlets, thereby allowing inquiries and reports of the condition of the immediate environment of each outlet. In addition, outlets can be configured with sensors to report on voltage, temperature, and other measurable quantities.

63 Claims, 9 Drawing Sheets

U.S. PATENT DOCUMENTS

| | | | |
|---|---|---|---|
| 3,846,638 A | 11/1974 | Wetherell | |
| 3,872,319 A | 3/1975 | Platzer | |
| 3,909,821 A | 9/1975 | Jagoda et al. | |
| 3,959,772 A | 5/1976 | Wakasa et al. | |
| 3,962,547 A | 6/1976 | Pattantyus-Abraham | |
| 3,973,240 A | 8/1976 | Fong | |
| 3,993,989 A | 11/1976 | Held et al. | |
| 4,024,528 A | 5/1977 | Boggs et al. | |
| 4,032,911 A | 6/1977 | Melvin, Jr. | |
| 4,060,735 A | 11/1977 | Pascucci et al. | |
| 4,130,874 A | 12/1978 | Pai | |
| 4,135,181 A | 1/1979 | Bogacki et al. | |
| 4,136,319 A | 1/1979 | Bourde | |
| 4,161,720 A | 7/1979 | Bogacki | |
| 4,163,218 A | 7/1979 | Wu | |
| 4,194,418 A | 3/1980 | Pechacek et al. | |
| 4,200,862 A | 4/1980 | Campbell et al. | |
| 4,216,543 A | 8/1980 | Cagle et al. | |
| 4,270,206 A | 5/1981 | Hughes | |
| 4,272,759 A | 6/1981 | Handy | |
| 4,302,750 A | 11/1981 | Wadhwani et al. | |
| 4,303,993 A | 12/1981 | Panepinto, Jr. et al. | |
| 4,329,678 A | 5/1982 | Hatfield | |
| 4,330,687 A | 5/1982 | Foulkes et al. | |
| 4,335,464 A | 6/1982 | Armstrong et al. | |
| 4,348,582 A | 9/1982 | Budek | |
| 4,348,668 A | 9/1982 | Gurr et al. | |
| 4,357,605 A | 11/1982 | Clements | |
| 4,381,427 A | 4/1983 | Cheal et al. | |
| 4,382,248 A | 5/1983 | Pai | |
| 4,389,694 A | 6/1983 | Cornwell, Jr. | |
| 4,390,986 A | 6/1983 | Moses | |
| 4,402,059 A | 8/1983 | Kennon et al. | |
| 4,417,207 A | 11/1983 | Sato | |
| 4,418,333 A | 11/1983 | Schwarzbach et al. | |
| 4,430,639 A | 2/1984 | Bennett et al. | |
| 4,458,236 A | 7/1984 | Perkins | |
| 4,462,113 A | 7/1984 | Iwata | |
| 4,463,341 A | 7/1984 | Iwasaki | |
| 4,467,314 A | 8/1984 | Weikel et al. | |
| 4,468,792 A | 8/1984 | Baker et al. | |
| 4,477,896 A | 10/1984 | Aker | |
| 4,479,215 A | 10/1984 | Baker | |
| 4,481,501 A | 11/1984 | Perkins | |
| 4,484,185 A | 11/1984 | Graves | |
| 4,493,092 A | 1/1985 | Adams | |
| 4,507,793 A | 3/1985 | Adams | |
| 4,510,611 A | 4/1985 | Dougherty | |
| 4,528,667 A | 7/1985 | Fruhauf | |
| 4,535,401 A | 8/1985 | Penn | |
| 4,551,721 A | 11/1985 | Kozlik | |
| 4,577,333 A | 3/1986 | Lewis et al. | |
| 4,578,537 A | 3/1986 | Faggin et al. | |
| 4,580,276 A | 4/1986 | Andruzzi, Jr. et al. | |
| 4,602,240 A | 7/1986 | Perkins et al. | |
| 4,633,217 A | 12/1986 | Akano | |
| 4,636,914 A | 1/1987 | Belli | |
| 4,639,714 A | 1/1987 | Crowe | |
| 4,647,725 A | 3/1987 | Dellinger et al. | |
| 4,651,022 A | 3/1987 | Cowley | |
| 4,665,544 A | 5/1987 | Honda et al. | |
| 4,668,934 A | 5/1987 | Shuey | |
| 4,686,382 A | 8/1987 | Shuey | |
| 4,686,641 A | 8/1987 | Evans | |
| 4,692,761 A | 9/1987 | Robinton | |
| 4,697,166 A | 9/1987 | Warnagiris et al. | |
| 4,703,306 A | 10/1987 | Barritt | |
| 4,733,389 A | 3/1988 | Puvogel | |
| 4,734,919 A | 3/1988 | Tae | |
| 4,734,932 A | 3/1988 | Lott | |
| 4,736,367 A | 4/1988 | Wroblewski et al. | |
| 4,740,963 A | 4/1988 | Eckley | |
| 4,750,094 A | 6/1988 | Krasik | |
| 4,755,792 A | 7/1988 | Pezzolo et al. | |
| 4,761,646 A | 8/1988 | Choquet et al. | |
| 4,763,104 A | 8/1988 | Inoue et al. | |
| 4,785,448 A | 11/1988 | Reichert et al. | |
| 4,787,082 A | 11/1988 | Delaney et al. | |
| 4,799,211 A | 1/1989 | Felker et al. | |
| 4,803,485 A | 2/1989 | Rypinski | |
| 4,806,905 A | 2/1989 | McGowan, III et al. | |
| 4,809,296 A | 2/1989 | Braun et al. | |
| 4,814,941 A | 3/1989 | Speet et al. | |
| 4,815,106 A | 3/1989 | Propp et al. | |
| 4,841,281 A | 6/1989 | Melvin, Jr. | |
| 4,866,733 A | 9/1989 | Morishita | |
| 4,890,102 A | 12/1989 | Oliver | |
| 4,896,349 A | 1/1990 | Kubo et al. | |
| 4,901,218 A | 2/1990 | Cornwell | |
| 4,903,292 A | 2/1990 | Dillon | |
| 4,918,690 A | 4/1990 | Markkula, Jr. et al. | |
| 4,924,349 A | 5/1990 | Buehler et al. | |
| 4,926,158 A | 5/1990 | Zeigler | |
| 4,937,811 A | 6/1990 | Harris | |
| 4,953,055 A | 8/1990 | Douhet et al. | |
| 4,992,774 A | 2/1991 | McCullough | |
| 5,010,399 A | 4/1991 | Goodman | |
| 5,021,779 A | 6/1991 | Bisak | |
| 5,032,819 A | 7/1991 | Sakuragi et al. | |
| 5,033,062 A | 7/1991 | Morrow et al. | |
| 5,033,112 A | 7/1991 | Bowling et al. | |
| 5,034,531 A | 7/1991 | Friary et al. | |
| 5,065,133 A | 11/1991 | Howard | |
| 5,068,890 A | 11/1991 | Nilssen | |
| 5,070,442 A | 12/1991 | Syron-Townson et al. | |
| 5,089,927 A | 2/1992 | Bulan et al. | |
| 5,089,974 A | 2/1992 | Demeyer et al. | |
| 5,093,828 A | 3/1992 | Braun et al. | |
| 5,099,444 A | 3/1992 | Wilson et al. | |
| 5,109,222 A | 4/1992 | Welty | |
| 5,111,497 A | 5/1992 | Bliven et al. | |
| 5,114,365 A | 5/1992 | Thompson | |
| 5,121,482 A | 6/1992 | Patton | |
| 5,144,544 A | 9/1992 | Jenneve et al. | |
| 5,148,144 A | 9/1992 | Sutterlin et al. | |
| 5,155,466 A | 10/1992 | Go | |
| 5,161,021 A | 11/1992 | Tsai | |
| 5,192,231 A | 3/1993 | Dolin | |
| 5,198,796 A | 3/1993 | Hessling, Jr. | |
| 5,264,823 A | 11/1993 | Stevens | |
| 5,265,154 A | 11/1993 | Schotz | |
| 5,274,631 A | 12/1993 | Bhardwaj | |
| 5,283,825 A | 2/1994 | Druckman et al. | |
| 5,285,477 A | 2/1994 | Leonowich | |
| 5,311,518 A | 5/1994 | Takato et al. | |
| 5,334,975 A | 8/1994 | Wachob et al. | |
| 5,341,415 A | 8/1994 | Baran | |
| 5,345,437 A | 9/1994 | Ogawa | |
| 5,347,549 A | 9/1994 | Baumann et al. | |
| 5,352,957 A | 10/1994 | Werner | |
| 5,368,041 A | 11/1994 | Shambroom | |
| 5,369,356 A | 11/1994 | Kinney et al. | |
| 5,381,462 A | 1/1995 | Larson et al. | |
| 5,381,804 A | 1/1995 | Shambroom | |
| 5,391,932 A | 2/1995 | Small et al. | |
| 5,400,246 A | 3/1995 | Wilson et al. | |
| 5,402,902 A | 4/1995 | Bouley | |
| 5,406,260 A | 4/1995 | Cummings et al. | |
| 5,414,708 A | 5/1995 | Webber et al. | |
| 5,422,519 A | 6/1995 | Russell | |
| 5,425,089 A | 6/1995 | Chan et al. | |
| 5,428,608 A | 6/1995 | Freeman et al. | |
| 5,438,678 A | 8/1995 | Smith | |
| 5,450,393 A | 9/1995 | Watanabe et al. | |
| 5,451,923 A | 9/1995 | Seberger et al. | |
| 5,457,629 A | 10/1995 | Miller et al. | |
| 5,459,459 A | 10/1995 | Lee, Jr. | |
| 5,469,150 A | 11/1995 | Sitte | |
| 5,473,517 A | 12/1995 | Blackmon | |
| 5,475,363 A | 12/1995 | Suzuki et al. | |
| 5,477,091 A | 12/1995 | Fiorina et al. | |
| 5,479,447 A | 12/1995 | Chow et al. | |
| 5,483,656 A | 1/1996 | Oprescu et al. | |
| 5,491,402 A | 2/1996 | Small | |
| 5,500,794 A | 3/1996 | Fujita | |
| 5,513,251 A | 4/1996 | Rochkind et al. | |
| 5,517,172 A | 5/1996 | Chiu | |

| | | | | | | |
|---|---|---|---|---|---|---|
| 5,519,731 A | 5/1996 | Cioffi | | 5,832,364 A | 11/1998 | Gustafson |
| 5,521,491 A | 5/1996 | Najam | | 5,833,350 A | 11/1998 | Moreland |
| 5,525,962 A | 6/1996 | Tice | | 5,841,360 A | 11/1998 | Binder |
| 5,528,089 A | 6/1996 | Guiset et al. | | 5,844,789 A | 12/1998 | Wynn |
| 5,530,748 A | 6/1996 | Ohmori | | 5,844,949 A | 12/1998 | Hershey et al. |
| 5,534,912 A | 7/1996 | Kostreski | | 5,848,054 A | 12/1998 | Mosebrook et al. |
| 5,535,336 A | 7/1996 | Smith et al. | | 5,859,584 A | 1/1999 | Counsell et al. |
| 5,539,821 A | 7/1996 | Blonder | | 5,859,596 A | 1/1999 | McRae |
| 5,546,385 A | 8/1996 | Caspi et al. | | 5,864,284 A | 1/1999 | Sanderson |
| 5,550,900 A | 8/1996 | Ensor et al. | | 5,884,086 A | 3/1999 | Amoni et al. |
| 5,557,612 A | 9/1996 | Bingham | | 5,886,732 A | 3/1999 | Humpleman |
| 5,559,377 A | 9/1996 | Abraham | | 5,889,856 A | 3/1999 | O'Toole et al. |
| 5,563,515 A | 10/1996 | Kako | | 5,892,430 A | 4/1999 | Wiesman et al. |
| 5,563,782 A | 10/1996 | Chen et al. | | 5,895,985 A | 4/1999 | Fischer |
| 5,569,209 A | 10/1996 | Reitman | | 5,896,443 A | 4/1999 | Dichter et al. |
| 5,572,182 A | 11/1996 | De Pinho Filho et al. | | 5,898,761 A | 4/1999 | McHale et al. |
| 5,574,256 A | 11/1996 | Cottone | | 5,905,442 A | 5/1999 | Mosebrook et al. |
| 5,579,335 A | 11/1996 | Sutterlin et al. | | 5,905,781 A | 5/1999 | McHale et al. |
| 5,579,486 A | 11/1996 | Oprescu et al. | | 5,905,786 A | 5/1999 | Hoopes |
| 5,592,482 A | 1/1997 | Abraham | | 5,910,970 A | 6/1999 | Lu |
| 5,594,789 A | 1/1997 | Seazholtz et al. | | 5,912,895 A | 6/1999 | Terry et al. |
| 5,608,447 A | 3/1997 | Farry et al. | | 5,917,814 A | 6/1999 | Balatoni |
| 5,608,725 A | 3/1997 | Grube et al. | | 5,929,749 A | 7/1999 | Slonim et al. |
| 5,610,552 A | 3/1997 | Schlesinger et al. | | 5,933,073 A | 8/1999 | Shuey |
| 5,613,190 A | 3/1997 | Hylton | | 5,936,963 A | 8/1999 | Saussy |
| 5,613,191 A | 3/1997 | Hylton et al. | | 5,937,342 A | 8/1999 | Kline |
| 5,614,811 A | 3/1997 | Sagalovich et al. | | 5,939,801 A | 8/1999 | Bouffard et al. |
| 5,619,505 A | 4/1997 | Grube et al. | | 5,940,738 A | 8/1999 | Rao |
| 5,623,537 A | 4/1997 | Ensor et al. | | 5,944,831 A | 8/1999 | Pate et al. |
| 5,625,651 A | 4/1997 | Cioffi | | 5,956,323 A | 9/1999 | Bowie |
| 5,625,677 A | 4/1997 | Feiertag et al. | | 5,960,208 A | 9/1999 | Obata et al. |
| 5,627,501 A | 5/1997 | Biran et al. | | 5,968,118 A | 10/1999 | Sutton |
| 5,635,896 A | 6/1997 | Tinsley et al. | | 5,973,942 A | 10/1999 | Nelson et al. |
| 5,644,286 A | 7/1997 | Brosh et al. | | 5,974,553 A | 10/1999 | Gandar |
| 5,652,893 A | 7/1997 | Ben-Meir et al. | | 5,977,650 A | 11/1999 | Rickard et al. |
| 5,668,814 A | 9/1997 | Balatoni | | 5,977,913 A | 11/1999 | Christ |
| 5,668,857 A | 9/1997 | McHale | | 5,982,052 A | 11/1999 | Sosnowski |
| 5,673,290 A | 9/1997 | Cioffi | | 5,987,061 A | 11/1999 | Chen |
| 5,680,397 A | 10/1997 | Christensen et al. | | 5,990,577 A | 11/1999 | Kamioka et al. |
| 5,684,826 A | 11/1997 | Ratner | | 5,991,311 A | 11/1999 | Long et al. |
| 5,689,230 A | 11/1997 | Merwin et al. | | 5,991,885 A | 11/1999 | Chang et al. |
| 5,689,242 A | 11/1997 | Sims et al. | | 5,994,998 A | 11/1999 | Fisher et al. |
| 5,691,691 A | 11/1997 | Merwin et al. | | 5,999,518 A | 12/1999 | Nattkemper et al. |
| 5,694,108 A | 12/1997 | Shuey | | 6,002,662 A | 12/1999 | Nattkemper et al. |
| 5,696,861 A | 12/1997 | Schimmeyer et al. | | 6,005,476 A | 12/1999 | Valiulis |
| 5,699,276 A | 12/1997 | Roos | | 6,010,228 A | 1/2000 | Blackman |
| 5,699,413 A | 12/1997 | Sridhar | | 6,011,781 A | 1/2000 | Bell |
| 5,708,705 A | 1/1998 | Yamashita | | 6,011,910 A | 1/2000 | Chau et al. |
| 5,712,614 A | 1/1998 | Patel et al. | | 6,014,386 A | 1/2000 | Abraham |
| 5,712,977 A | 1/1998 | Glad et al. | | 6,014,431 A | 1/2000 | McHale et al. |
| 5,722,076 A | 2/1998 | Sakabe et al. | | 6,016,519 A | 1/2000 | Chida et al. |
| 5,731,664 A | 3/1998 | Posa | | 6,021,158 A | 2/2000 | Schurr et al. |
| 5,736,965 A | 4/1998 | Mosebrook et al. | | 6,025,945 A | 2/2000 | Nyu et al. |
| 5,748,634 A | 5/1998 | Sokol et al. | | 6,026,160 A | 2/2000 | Staber et al. |
| 5,748,671 A | 5/1998 | Sutterlin et al. | | 6,028,867 A | 2/2000 | Rawson et al. |
| 5,751,701 A | 5/1998 | Langberg et al. | | 6,033,101 A | 3/2000 | Reddick et al. |
| 5,754,539 A | 5/1998 | Metz et al. | | 6,034,988 A | 3/2000 | VanderMey et al. |
| 5,756,280 A | 5/1998 | Soora et al. | | 6,037,678 A | 3/2000 | Rickard |
| 5,757,936 A | 5/1998 | Lee | | 6,038,300 A | 3/2000 | Hartmann et al. |
| 5,768,279 A | 6/1998 | Barn et al. | | 6,038,457 A | 3/2000 | Barkat |
| 5,768,552 A | 6/1998 | Jacoby | | 6,049,471 A | 4/2000 | Korcharz et al. |
| 5,771,236 A | 6/1998 | Sansom et al. | | 6,049,531 A | 4/2000 | Roy |
| 5,777,769 A | 7/1998 | Coutinho | | 6,049,881 A | 4/2000 | Massman et al. |
| 5,781,617 A | 7/1998 | McHale et al. | | 6,055,268 A | 4/2000 | Timm et al. |
| 5,790,548 A | 8/1998 | Sistanizadeh et al. | | 6,055,435 A | 4/2000 | Smith et al. |
| 5,793,413 A | 8/1998 | Hylton et al. | | 6,055,633 A | 4/2000 | Schrier et al. |
| 5,796,965 A | 8/1998 | Choi et al. | | 6,061,261 A | 5/2000 | Chen et al. |
| 5,799,196 A | 8/1998 | Flannery | | 6,064,422 A | 5/2000 | Goolcharan et al. |
| 5,801,635 A | 9/1998 | Price | | 6,069,879 A | 5/2000 | Chatter |
| 5,805,597 A | 9/1998 | Edem | | 6,072,779 A | 6/2000 | Tzannes et al. |
| 5,809,033 A | 9/1998 | Turner et al. | | 6,072,810 A | 6/2000 | Van der Putten et al. |
| 5,812,750 A | 9/1998 | Dev et al. | | 6,075,784 A | 6/2000 | Frankel et al. |
| 5,815,086 A | 9/1998 | Ivie et al. | | 6,087,835 A | 7/2000 | Haneda |
| 5,815,681 A | 9/1998 | Kikinis | | 6,095,867 A | 8/2000 | Brandt et al. |
| 5,818,127 A | 10/1998 | Abraham | | 6,097,761 A | 8/2000 | Buhring et al. |
| 5,822,374 A | 10/1998 | Levin | | 6,104,707 A | 8/2000 | Abraham |
| 5,828,293 A | 10/1998 | Rickard | | 6,107,656 A | 8/2000 | Igarashi |
| 5,828,558 A | 10/1998 | Korcharz et al. | | 6,111,595 A | 8/2000 | Hertrich |
| 5,832,057 A | 11/1998 | Furman | | 6,111,936 A | 8/2000 | Bremer |

| | | | | | | |
|---|---|---|---|---|---|---|
| 6,114,632 | A | 9/2000 | Planas, Sr. et al. | 6,389,110 B1 | 5/2002 | Fischer et al. |
| 6,115,468 | A | 9/2000 | De Nicolo | 6,389,139 B1 | 5/2002 | Curtis et al. |
| 6,115,755 | A | 9/2000 | Krishan | 6,393,607 B1 | 5/2002 | Hughes et al. |
| 6,115,822 | A | 9/2000 | Kim et al. | 6,396,391 B1 | 5/2002 | Binder |
| 6,123,577 | A | 9/2000 | Contois et al. | 6,396,393 B2 | 5/2002 | Yuasa |
| 6,125,448 | A | 9/2000 | Schwan et al. | 6,396,837 B1 | 5/2002 | Wang et al. |
| 6,127,925 | A | 10/2000 | Bonsignore et al. | 6,397,288 B1 | 5/2002 | Rye et al. |
| 6,130,879 | A | 10/2000 | Liu | 6,404,861 B1 | 6/2002 | Cohen et al. |
| 6,137,866 | A | 10/2000 | Staber et al. | 6,417,762 B1 | 7/2002 | Comer |
| 6,141,330 | A | 10/2000 | Akers | 6,420,964 B1 | 7/2002 | Nishikaws |
| 6,141,339 | A | 10/2000 | Kaplan et al. | 6,433,672 B1 | 8/2002 | Shirmard |
| 6,141,763 | A | 10/2000 | Smith et al. | 6,438,109 B1 | 8/2002 | Karaoguz et al. |
| 6,148,006 | A | 11/2000 | Dyke et al. | 6,441,723 B1 | 8/2002 | Mansfield, Jr. et al. |
| 6,166,496 | A | 12/2000 | Lys et al. | 6,442,129 B1 | 8/2002 | Yonge, III et al. |
| 6,167,043 | A | 12/2000 | Frantz | 6,442,195 B1 | 8/2002 | Liu et al. |
| 6,175,556 | B1 | 1/2001 | Allen, Jr. et al. | 6,445,087 B1 | 9/2002 | Wang et al. |
| 6,177,884 | B1 | 1/2001 | Hunt et al. | 6,448,899 B1 | 9/2002 | Thompson |
| 6,178,161 | B1 | 1/2001 | Terry | 6,449,348 B1 | 9/2002 | Lamb et al. |
| 6,181,775 | B1 | 1/2001 | Bella | 6,452,923 B1 | 9/2002 | Gerszberg et al. |
| 6,186,826 | B1 | 2/2001 | Weikle | 6,456,714 B2 | 9/2002 | Shima et al. |
| 6,188,314 | B1 | 2/2001 | Wallace et al. | 6,459,175 B1 | 10/2002 | Potega |
| 6,188,557 | B1 | 2/2001 | Chaudhry | 6,459,275 B1 | 10/2002 | Ewalt et al. |
| 6,192,399 | B1 | 2/2001 | Goodman | 6,459,692 B1 | 10/2002 | Ben-Michael et al. |
| 6,205,202 | B1 | 3/2001 | Yoshida et al. | 6,470,401 B1 | 10/2002 | Peterson |
| 6,207,895 | B1 | 3/2001 | Engel | 6,473,608 B1 | 10/2002 | Lehr et al. |
| 6,208,637 | B1 | 3/2001 | Eames | 6,474,829 B2 | 11/2002 | Clodfelter |
| 6,212,204 | B1 | 4/2001 | Depue | 6,475,022 B2 | 11/2002 | Tamino |
| 6,212,658 | B1 | 4/2001 | Le Van Suu | 6,477,457 B1 | 11/2002 | Fendt et al. |
| 6,215,855 | B1 | 4/2001 | Schneider | 6,477,595 B1 | 11/2002 | Cohen et al. |
| 6,216,160 | B1 | 4/2001 | Dichter | 6,480,122 B1 | 11/2002 | Oddy et al. |
| 6,218,930 | B1 | 4/2001 | Katzenberg et al. | 6,481,013 B1 | 11/2002 | Dinwiddie et al. |
| 6,222,124 | B1 | 4/2001 | Pritchard | 6,483,903 B1 | 11/2002 | Itay et al. |
| 6,222,853 | B1 | 4/2001 | Mesttinen | 6,490,273 B1 | 12/2002 | DeNap et al. |
| 6,229,433 | B1 | 5/2001 | Rye et al. | 6,492,897 B1 | 12/2002 | Mowery, Jr. |
| 6,229,818 | B1 | 5/2001 | Bell | 6,493,875 B1 | 12/2002 | Eames et al. |
| 6,239,672 | B1 | 5/2001 | Lutz, Jr. et al. | 6,496,103 B1 | 12/2002 | Weiss et al. |
| 6,240,091 | B1 | 5/2001 | Ginzboorg et al. | 6,496,104 B2 | 12/2002 | Kline |
| 6,243,394 | B1 | 6/2001 | Deng | 6,507,322 B2 | 1/2003 | Fang |
| 6,243,571 | B1 | 6/2001 | Bullock et al. | 6,518,724 B2 | 2/2003 | Janik |
| 6,243,818 | B1 | 6/2001 | Schwan et al. | 6,519,291 B1 | 2/2003 | Dagdeviren et al. |
| 6,246,716 | B1 | 6/2001 | Schneider | 6,522,515 B1 | 2/2003 | Whitney |
| 6,246,748 | B1 | 6/2001 | Yano | 6,526,516 B1 | 2/2003 | Ishikawa et al. |
| 6,249,213 | B1 | 6/2001 | Horne | 6,529,443 B2 | 3/2003 | Downey, Jr. et al. |
| 6,252,754 | B1 | 6/2001 | Chaudhry | 6,535,110 B1 | 3/2003 | Arora et al. |
| 6,252,755 | B1 | 6/2001 | Willer | 6,535,580 B1 | 3/2003 | Strauss et al. |
| 6,259,676 | B1 | 7/2001 | Kellock et al. | 6,535,983 B1 | 3/2003 | McCormack et al. |
| 6,266,348 | B1 | 7/2001 | Gross et al. | 6,541,878 B1 | 4/2003 | Diab |
| 6,272,219 | B1 | 8/2001 | De Bruycker et al. | 6,542,465 B1 | 4/2003 | Wang |
| 6,278,769 | B1 | 8/2001 | Bella | 6,543,940 B2 | 4/2003 | Chu |
| 6,281,784 | B1 | 8/2001 | Redgate et al. | 6,546,024 B1 | 4/2003 | Sharper et al. |
| 6,282,075 | B1 | 8/2001 | Chaudhry | 6,546,098 B1 | 4/2003 | Henderson |
| 6,286,049 | B1 | 9/2001 | Rajakarunanayake et al. | 6,546,494 B1 | 4/2003 | Jackson et al. |
| 6,288,334 | B1 | 9/2001 | Hennum | 6,553,076 B1 | 4/2003 | Huang |
| 6,288,631 | B1 | 9/2001 | Shinozaki et al. | 6,556,564 B2 | 4/2003 | Rogers |
| 6,290,141 | B1 | 9/2001 | Park et al. | 6,559,757 B1 | 5/2003 | Deller et al. |
| 6,297,450 | B1 | 10/2001 | Yu | 6,560,319 B1 | 5/2003 | Binder |
| 6,298,037 | B1 | 10/2001 | Sharifi | 6,571,181 B1 | 5/2003 | Rakshani et al. |
| 6,301,337 | B1 | 10/2001 | Scholtz et al. | 6,572,384 B1 | 6/2003 | Marchevsky |
| 6,301,527 | B1 | 10/2001 | Butland et al. | 6,574,237 B1 | 6/2003 | Bullman et al. |
| 6,308,240 | B1 | 10/2001 | De Nicolo | 6,574,741 B1 | 6/2003 | Fujimori et al. |
| 6,310,781 | B1 | 10/2001 | Karam | 6,577,231 B2 | 6/2003 | Litwin, Jr. et al. |
| 6,310,909 | B1 | 10/2001 | Jones | 6,580,727 B1 | 6/2003 | Yim et al. |
| 6,314,102 | B1 | 11/2001 | Czerwiec et al. | 6,583,719 B2 | 6/2003 | Okada et al. |
| 6,317,884 | B1 | 11/2001 | Eames et al. | 6,584,122 B1 | 6/2003 | Matthews et al. |
| 6,329,937 | B1 | 12/2001 | Harman | 6,584,148 B1 | 6/2003 | Zitting et al. |
| 6,346,964 | B1 | 2/2002 | Rogers et al. | 6,587,454 B1 | 7/2003 | Lamb |
| 6,348,874 | B1 | 2/2002 | Cole et al. | 6,597,732 B1 | 7/2003 | Dowling |
| 6,353,629 | B1 | 3/2002 | Pal | 6,601,097 B1 | 7/2003 | Cheston et al. |
| 6,359,906 | B1 | 3/2002 | Dyke et al. | 6,603,220 B2 | 8/2003 | Vergnaud |
| 6,362,987 | B1 | 3/2002 | Yurek et al. | 6,611,537 B1 | 8/2003 | Edens et al. |
| 6,363,066 | B1 | 3/2002 | Frimodig | 6,614,236 B1 | 9/2003 | Karam |
| 6,364,535 | B1 | 4/2002 | Coffey | 6,636,505 B1 | 10/2003 | Wang et al. |
| 6,366,143 | B1 | 4/2002 | Liu et al. | 6,639,913 B1 | 10/2003 | Frankel et al. |
| 6,377,163 | B1 | 4/2002 | Deller et al. | 6,640,308 B1 | 10/2003 | Keyghobad et al. |
| 6,377,874 | B1 | 4/2002 | Ykema | 6,643,566 B1 | 11/2003 | Lehr et al. |
| 6,380,852 | B1 | 4/2002 | Hartman et al. | 6,648,308 B2 | 11/2003 | Gunnar Rothoff |
| 6,383,076 | B1 | 5/2002 | Tiedeken | 6,650,622 B1 | 11/2003 | Austerman, III et al. |
| 6,385,203 | B2 | 5/2002 | McHale et al. | 6,653,932 B1 | 11/2003 | Beamish et al. |
| 6,388,990 | B1 | 5/2002 | Wetzel | 6,658,109 B1 | 12/2003 | Steinke et al. |

| Patent | Kind | Date | Name |
|---|---|---|---|
| 6,674,843 | B1 | 1/2004 | Ham |
| 6,674,845 | B2 | 1/2004 | Ayoub et al. |
| 6,680,940 | B1 | 1/2004 | Lewin et al. |
| 6,681,013 | B1 | 1/2004 | Miyamoto |
| 6,686,832 | B2 | 2/2004 | Abraham |
| 6,690,677 | B1 | 2/2004 | Binder |
| 6,700,970 | B1 | 3/2004 | Aronson et al. |
| 6,701,443 | B1 | 3/2004 | Bell |
| 6,710,553 | B2 | 3/2004 | Lagan |
| 6,711,260 | B1 | 3/2004 | Russell et al. |
| 6,714,534 | B1 | 3/2004 | Gerszberg et al. |
| 6,715,087 | B1 | 3/2004 | Vergnaud et al. |
| 6,725,059 | B1 | 4/2004 | Bell |
| 6,731,627 | B1 | 5/2004 | Gupta et al. |
| 6,738,470 | B1 | 5/2004 | Aronovitz |
| 6,738,641 | B1 | 5/2004 | Elsasser |
| 6,747,859 | B2 | 6/2004 | Walbeck et al. |
| 6,747,995 | B1 | 6/2004 | Brown et al. |
| 6,747,996 | B2 | 6/2004 | Holloway et al. |
| 6,754,235 | B2 | 6/2004 | Van Der Putten et al. |
| 6,759,946 | B2 | 7/2004 | Sahinoglu et al. |
| 6,760,384 | B1 | 7/2004 | Garreau et al. |
| 6,762,675 | B1 | 7/2004 | Cafiero et al. |
| 6,764,343 | B2 | 7/2004 | Ferentz |
| 6,765,149 | B1 | 7/2004 | Ku |
| 6,778,817 | B1 | 8/2004 | Bullock et al. |
| 6,792,323 | B2 | 9/2004 | Krzyzanowski et al. |
| 6,800,957 | B2 | 10/2004 | Nerone et al. |
| 6,804,351 | B1 | 10/2004 | Karam |
| 6,813,343 | B1 | 11/2004 | Vitenberg |
| 6,816,512 | B2 | 11/2004 | Lazarus et al. |
| 6,822,946 | B1 | 11/2004 | Wallace |
| 6,826,174 | B1 | 11/2004 | Erekson et al. |
| 6,838,997 | B1 | 1/2005 | Davidson |
| 6,839,345 | B2 | 1/2005 | Lu et al. |
| 6,841,979 | B2 | 1/2005 | Berson et al. |
| 6,842,426 | B2 | 1/2005 | Bogardus et al. |
| 6,842,459 | B1 | 1/2005 | Binder |
| 6,844,810 | B2 | 1/2005 | Cern |
| 6,853,724 | B2 | 2/2005 | Wang |
| 6,854,059 | B2 | 2/2005 | Gardner |
| 6,854,895 | B2 | 2/2005 | Coffey et al. |
| 6,856,799 | B1 | 2/2005 | Ritter |
| 6,864,798 | B2 | 3/2005 | Janik |
| 6,868,117 | B1 | 3/2005 | Mardinian |
| 6,868,265 | B2 | 3/2005 | Zodnik |
| 6,870,282 | B1 | 3/2005 | Bischoff et al. |
| 6,880,020 | B1 | 4/2005 | Rubinstein et al. |
| 6,885,674 | B2 | 4/2005 | Hunt et al. |
| 6,886,181 | B1 | 4/2005 | Dodds et al. |
| 6,895,089 | B2 | 5/2005 | Wang |
| 6,896,551 | B2 | 5/2005 | Hauck et al. |
| 6,898,413 | B2 | 5/2005 | Yip et al. |
| 6,901,439 | B1 | 5/2005 | Bonasia et al. |
| 6,904,149 | B2 | 6/2005 | Keenum et al. |
| 6,906,618 | B2 | 6/2005 | Hair, III et al. |
| 6,907,458 | B2 | 6/2005 | Tamassetti |
| 6,912,145 | B2 | 6/2005 | Hung et al. |
| 6,912,282 | B2 | 6/2005 | Karam |
| 6,927,340 | B1 | 8/2005 | Binder et al. |
| 6,932,624 | B1 | 8/2005 | Hoopes |
| 6,933,686 | B1 | 8/2005 | Bishel |
| 6,934,170 | B2 | 8/2005 | Ooishi |
| 6,934,300 | B2 | 8/2005 | Tamasetti |
| 6,937,056 | B2 | 8/2005 | Binder |
| 6,940,918 | B1 | 9/2005 | Nayler et al. |
| 6,940,956 | B1 | 9/2005 | Leach |
| 6,943,296 | B2 | 9/2005 | Perret |
| 6,943,683 | B2 | 9/2005 | Perret |
| 6,946,988 | B2 | 9/2005 | Edwards |
| 6,947,736 | B2 | 9/2005 | Shaver et al. |
| 6,954,863 | B2 | 10/2005 | Mouton |
| 6,955,560 | B1 | 10/2005 | Biggs |
| 6,956,462 | B2 | 10/2005 | Jetzt |
| 6,956,826 | B1 | 10/2005 | Binder |
| 6,961,303 | B1 | 11/2005 | Binder |
| 6,972,688 | B2 | 12/2005 | Rapaich |
| 6,973,394 | B2 | 12/2005 | Jaeger et al. |
| 6,975,209 | B2 | 12/2005 | Gromov |
| 6,975,211 | B2 | 12/2005 | Atsuta et al. |
| 6,975,713 | B2 | 12/2005 | Smith et al. |
| 6,977,507 | B1 | 12/2005 | Pannell et al. |
| 6,980,638 | B1 | 12/2005 | Smith et al. |
| 6,981,892 | B1 | 1/2006 | Kostalnik |
| 6,985,072 | B2 | 1/2006 | Omidi et al. |
| 6,986,071 | B2 | 1/2006 | Darshan et al. |
| 6,987,430 | B2 | 1/2006 | Wasaki et al. |
| 6,989,734 | B2 | 1/2006 | Thomas |
| 6,993,289 | B2 | 1/2006 | Janik |
| 6,995,657 | B2 | 2/2006 | Zalitzky et al. |
| 6,995,658 | B2 | 2/2006 | Tustison et al. |
| 6,996,134 | B1 | 2/2006 | Renucci et al. |
| 6,996,458 | B2 | 2/2006 | Pincu et al. |
| 6,999,433 | B2 | 2/2006 | Baum |
| 6,999,505 | B2 | 2/2006 | Yokoo et al. |
| 7,003,102 | B2 | 2/2006 | Kiko |
| 7,006,445 | B1 | 2/2006 | Cole et al. |
| 7,007,305 | B2 | 2/2006 | Carson et al. |
| 7,009,527 | B2 | 3/2006 | Seo |
| 7,012,922 | B1 | 3/2006 | Unitt et al. |
| 7,023,809 | B1 | 4/2006 | Rubinstein |
| 7,026,730 | B1 | 4/2006 | Marshall et al. |
| 7,026,917 | B2 | 4/2006 | Berkman |
| 7,027,483 | B2 | 4/2006 | Santhoff |
| 7,030,733 | B2 | 4/2006 | Abbarin |
| 7,034,225 | B2 | 4/2006 | Thompson |
| 7,035,270 | B2 | 4/2006 | Moore, Jr. et al. |
| 7,039,724 | B1 | 5/2006 | Lavian et al. |
| 7,046,983 | B2 | 5/2006 | Elkayam et al. |
| 7,049,514 | B2 | 5/2006 | Brandt et al. |
| 7,050,546 | B1 | 5/2006 | Richardson et al. |
| 7,053,501 | B1 | 5/2006 | Barrass |
| 7,054,442 | B2 | 5/2006 | Weikle |
| 7,058,174 | B2 | 6/2006 | Posthuma |
| 7,061,142 | B1 | 6/2006 | Marshall |
| 7,068,649 | B2 | 6/2006 | Fisher et al. |
| 7,068,682 | B2 | 6/2006 | Campbell et al. |
| 7,068,781 | B2 | 6/2006 | Le Creff et al. |
| 7,072,995 | B1 | 7/2006 | Burroughs |
| 7,079,012 | B2 | 7/2006 | Wetmore |
| 7,079,647 | B2 | 7/2006 | Tomobe |
| 7,081,827 | B2 | 7/2006 | Addy |
| 7,085,238 | B2 | 8/2006 | McBeath |
| 7,088,238 | B2 | 8/2006 | Karaoguz et al. |
| 7,089,126 | B2 | 8/2006 | Muir |
| 7,091,849 | B1 | 8/2006 | Henry |
| 7,098,773 | B2 | 8/2006 | Berkman |
| 7,106,261 | B2 | 9/2006 | Nagel et al. |
| 7,106,721 | B1 | 9/2006 | Binder |
| 7,116,685 | B2 | 10/2006 | Brown et al. |
| 7,133,423 | B1 | 11/2006 | Chow et al. |
| 7,135,982 | B2 | 11/2006 | Lee |
| 7,136,270 | B2 | 11/2006 | Liebenow |
| 7,136,936 | B2 | 11/2006 | Chan et al. |
| 7,148,799 | B2 | 12/2006 | Cern et al. |
| 7,149,182 | B1 | 12/2006 | Renucci et al. |
| 7,167,078 | B2 | 1/2007 | Pourchot |
| 7,167,923 | B2 | 1/2007 | Lo |
| 7,171,506 | B2 | 1/2007 | Iwamura |
| 7,176,786 | B2 | 2/2007 | Kline et al. |
| 7,180,412 | B2 | 2/2007 | Bonicatto et al. |
| 7,183,902 | B2 | 2/2007 | Hamburgen et al. |
| 7,190,716 | B2 | 3/2007 | Norrell et al. |
| 7,194,528 | B1 | 3/2007 | Davidow |
| 7,194,639 | B2 | 3/2007 | Atkinson et al. |
| 7,198,521 | B2 | 4/2007 | Hauck et al. |
| 7,199,699 | B1 | 4/2007 | Gidge |
| 7,199,706 | B2 | 4/2007 | Dawson et al. |
| 7,206,417 | B2 | 4/2007 | Nathan |
| 7,209,719 | B2 | 4/2007 | Liebenow |
| 7,209,945 | B2 | 4/2007 | Hicks, III et al. |
| 7,215,763 | B1 | 5/2007 | Keller et al. |
| 7,224,272 | B2 | 5/2007 | White, II et al. |
| 7,239,627 | B2 | 7/2007 | Nattkemper et al. |
| 7,239,628 | B1 | 7/2007 | Pendleton et al. |
| 7,242,729 | B1 | 7/2007 | Heistermann et al. |
| 7,245,625 | B2 | 7/2007 | Manis et al. |
| 7,247,793 | B2 | 7/2007 | Hinkson et al. |

| | | |
|---|---|---|
| 7,256,704 B2 | 8/2007 | Yoon et al. |
| 7,257,106 B2 | 8/2007 | Chen et al. |
| 7,263,362 B1 | 8/2007 | Young et al. |
| 7,265,664 B2 | 9/2007 | Berkman |
| 7,266,344 B2 | 9/2007 | Rodriguez |
| 7,274,669 B2 | 9/2007 | Czerwiec et al. |
| 7,276,915 B1 | 10/2007 | Euler et al. |
| 7,283,554 B2 | 10/2007 | Ophir et al. |
| 7,292,859 B2 | 11/2007 | Park |
| 7,293,103 B1 | 11/2007 | Lin et al. |
| 7,301,940 B1 | 11/2007 | Bernstein |
| 7,307,510 B2 | 12/2007 | Berkman |
| 7,317,793 B2 | 1/2008 | Binder |
| 7,319,717 B2 | 1/2008 | Zitting |
| 7,323,968 B2 | 1/2008 | Wamura |
| 7,324,824 B2 | 1/2008 | Smith et al. |
| 7,339,458 B2 | 3/2008 | Cern |
| 7,340,509 B2 | 3/2008 | Daum et al. |
| 7,345,998 B2 | 3/2008 | Cregg et al. |
| 7,349,325 B2 | 3/2008 | Trzeciak et al. |
| 7,375,445 B1 | 5/2008 | Smith |
| 7,401,239 B2 | 7/2008 | Chan et al. |
| 7,406,094 B2 | 7/2008 | Propp et al. |
| 7,406,536 B2 | 7/2008 | Efrati et al. |
| 7,408,949 B2 | 8/2008 | Baum |
| 7,413,471 B2 | 8/2008 | Chan |
| 2001/0030470 A1 | 10/2001 | Waugh |
| 2001/0040918 A1 | 11/2001 | Krinsky et al. |
| 2002/0011923 A1 | 1/2002 | Cunningham et al. |
| 2002/0024424 A1 | 2/2002 | Burns et al. |
| 2002/0038153 A1 | 3/2002 | Amodeo |
| 2002/0039388 A1 | 4/2002 | Smart et al. |
| 2002/0056116 A1 | 5/2002 | Smith |
| 2002/0063584 A1 | 5/2002 | Molenda et al. |
| 2002/0080010 A1 | 6/2002 | Zhang |
| 2002/0104009 A1 | 8/2002 | Zodnik |
| 2002/0118664 A1 | 8/2002 | Ishibashi et al. |
| 2002/0145509 A1 | 10/2002 | Karny et al. |
| 2002/0161912 A1 | 10/2002 | Vasquez et al. |
| 2002/0166125 A1 | 11/2002 | Fulmer, II |
| 2002/0194383 A1 | 12/2002 | Cohen et al. |
| 2002/0194605 A1 | 12/2002 | Cohen et al. |
| 2003/0006881 A1 | 1/2003 | Reyes |
| 2003/0035471 A1 | 2/2003 | Pitsoulakis |
| 2003/0039257 A1 | 2/2003 | Manis |
| 2003/0046377 A1 | 3/2003 | Daum et al. |
| 2003/0053443 A1 | 3/2003 | Owens |
| 2003/0061522 A1 | 3/2003 | Ke et al. |
| 2003/0062990 A1 | 4/2003 | Schaeffer, Jr. et al. |
| 2003/0087646 A1 | 5/2003 | Funato et al. |
| 2003/0088706 A1 | 5/2003 | Chan et al. |
| 2003/0090368 A1 | 5/2003 | Ide et al. |
| 2003/0099228 A1 | 5/2003 | Alcock |
| 2003/0103521 A1 | 6/2003 | Raphaeli et al. |
| 2003/0112965 A1 | 6/2003 | McNamara et al. |
| 2003/0123462 A1 | 7/2003 | Kusayanagi |
| 2003/0133473 A1 | 7/2003 | Manis et al. |
| 2003/0133476 A1 | 7/2003 | Stone et al. |
| 2003/0151695 A1 | 8/2003 | Sahlin et al. |
| 2003/0154273 A1 | 8/2003 | Caveney |
| 2003/0154276 A1 | 8/2003 | Caveney |
| 2003/0161333 A1 | 8/2003 | Schain |
| 2003/0224728 A1 | 12/2003 | Heinonen et al. |
| 2004/0006484 A1 | 1/2004 | Manis et al. |
| 2004/0013098 A1 | 1/2004 | Tseng et al. |
| 2004/0033817 A1 | 2/2004 | Gorsulch |
| 2004/0037317 A1 | 2/2004 | Zalitzky et al. |
| 2004/0073597 A1 | 4/2004 | Caveney et al. |
| 2004/0105539 A1 | 6/2004 | Auzizeau et al. |
| 2004/0121648 A1 | 6/2004 | Voros |
| 2004/0125819 A1 | 7/2004 | Binder |
| 2004/0130413 A1 | 7/2004 | Mentz et al. |
| 2004/0136384 A1 | 7/2004 | Cho |
| 2004/0146061 A1 | 7/2004 | Bisceglia et al. |
| 2004/0147232 A1 | 7/2004 | Zodnik |
| 2004/0156513 A1 | 8/2004 | Kaylor et al. |
| 2004/0162117 A1 | 8/2004 | Liebenow |
| 2004/0164619 A1 | 8/2004 | Parker et al. |
| 2004/0177167 A1 | 9/2004 | Iwamura et al. |
| 2004/0178888 A1 | 9/2004 | Hales et al. |
| 2004/0192285 A1 | 9/2004 | Capobianco et al. |
| 2004/0198236 A1 | 10/2004 | Paine et al. |
| 2004/0204017 A1 | 10/2004 | Eckel et al. |
| 2004/0230846 A1 | 11/2004 | Mancey et al. |
| 2004/0232768 A1 | 11/2004 | Hung et al. |
| 2004/0236967 A1 | 11/2004 | Korcharz et al. |
| 2004/0259538 A1 | 12/2004 | Agbegnenow |
| 2004/0268160 A1 | 12/2004 | Atkinson et al. |
| 2005/0010954 A1 | 1/2005 | Binder |
| 2005/0015805 A1 | 1/2005 | Iwamura |
| 2005/0018648 A1 | 1/2005 | Scheelke |
| 2005/0018766 A1 | 1/2005 | Iwamura |
| 2005/0018857 A1 | 1/2005 | McCarty et al. |
| 2005/0047379 A1 | 3/2005 | Boyden et al. |
| 2005/0047431 A1 | 3/2005 | Binder |
| 2005/0053087 A1 | 3/2005 | Pulyk |
| 2005/0063108 A1 | 3/2005 | Voll et al. |
| 2005/0073968 A1 | 4/2005 | Perlman |
| 2005/0076148 A1 | 4/2005 | Chan et al. |
| 2005/0076149 A1 | 4/2005 | McKown et al. |
| 2005/0076151 A1 | 4/2005 | Tapperson et al. |
| 2005/0076375 A1 | 4/2005 | Nakamura |
| 2005/0078700 A1 | 4/2005 | Thompson et al. |
| 2005/0086389 A1 | 4/2005 | Chang |
| 2005/0097369 A1 | 5/2005 | Bowser et al. |
| 2005/0125083 A1 | 6/2005 | Kiko |
| 2005/0125507 A1 | 6/2005 | Atias et al. |
| 2005/0129069 A1 | 6/2005 | Binder |
| 2005/0136972 A1 | 6/2005 | Smith et al. |
| 2005/0136989 A1 | 6/2005 | Dove |
| 2005/0152306 A1 | 7/2005 | Bonnassieux et al. |
| 2005/0152323 A1 | 7/2005 | Bonnassieux et al. |
| 2005/0152337 A1 | 7/2005 | Wurtzel et al. |
| 2005/0177640 A1 | 8/2005 | Rubinstein et al. |
| 2005/0184915 A1 | 8/2005 | Nagel et al. |
| 2005/0201306 A1 | 9/2005 | Engel |
| 2005/0208825 A1 | 9/2005 | Chan |
| 2005/0226200 A1 | 10/2005 | Askildsen et al. |
| 2005/0228889 A1 | 10/2005 | Cohen et al. |
| 2005/0239400 A1 | 10/2005 | Narikawa |
| 2005/0245127 A1 | 11/2005 | Nordin |
| 2005/0268120 A1 | 12/2005 | Schindler et al. |
| 2005/0268322 A1 | 12/2005 | Watson |
| 2005/0272372 A1 | 12/2005 | Rodriguez |
| 2005/0273790 A1 | 12/2005 | Kearney |
| 2005/0280598 A1 | 12/2005 | Webb et al. |
| 2005/0281326 A1 | 12/2005 | Yu |
| 2006/0006817 A1 | 1/2006 | Chason |
| 2006/0007945 A1 | 1/2006 | Schoettle et al. |
| 2006/0017324 A1 | 1/2006 | Pace et al. |
| 2006/0020525 A1 | 1/2006 | Borelli et al. |
| 2006/0053324 A1 | 3/2006 | Giat et al. |
| 2006/0079969 A1 | 4/2006 | Sequin |
| 2006/0089230 A1 | 4/2006 | Biederman et al. |
| 2006/0104291 A1 | 5/2006 | Rodriguez |
| 2006/0140260 A1 | 6/2006 | Wasaki et al. |
| 2006/0165097 A1 | 7/2006 | Caveney |
| 2006/0168459 A1 | 7/2006 | Dwelley et al. |
| 2006/0181398 A1 | 8/2006 | Martich et al. |
| 2006/0222086 A1 | 10/2006 | Frye, Jr. |
| 2007/0025368 A1 | 2/2007 | Ha et al. |
| 2007/0036171 A1 | 2/2007 | Magin |
| 2007/0082649 A1 | 4/2007 | Chan |
| 2007/0112939 A1 | 5/2007 | Wilson et al. |
| 2007/0167144 A1 | 7/2007 | Koga et al. |
| 2007/0198748 A1 | 8/2007 | Ametsitsi et al. |
| 2007/0206629 A1 | 9/2007 | Choi |
| 2007/0213879 A1 | 9/2007 | Iwamura |
| 2008/0013612 A1 | 1/2008 | Miller et al. |
| 2008/0013637 A1 | 1/2008 | Kodama et al. |
| 2008/0125187 A1 | 5/2008 | Chang et al. |
| 2008/0136915 A1 | 6/2008 | Iwamura |
| 2008/0140565 A1 | 6/2008 | DeBenedetti et al. |
| 2008/0153415 A1 | 6/2008 | Block et al. |
| 2008/0165463 A1 | 7/2008 | Chan |
| 2008/0175256 A1 | 7/2008 | Binder |
| 2008/0186150 A1 | 8/2008 | Kao |

FOREIGN PATENT DOCUMENTS

| | | |
|---|---|---|
| EP | 0 241 152 A2 | 10/1987 |
| EP | 0355532 | 2/1990 |
| EP | 0 961 466 | 12/1999 |
| EP | 1 343 253 A1 | 9/2003 |
| GB | 2 301 743 A | 12/1996 |
| GB | 2 368 979 A | 5/2002 |
| JP | 55132197 A2 | 10/1980 |
| WO | 9623377 A1 | 8/1996 |
| WO | WO 96/23377 | 8/1996 |
| WO | WO 97/50193 A1 | 12/1997 |
| WO | WO 98/37648 A1 | 8/1998 |
| WO | 9857483 | 12/1998 |
| WO | WO 99/03255 A1 | 1/1999 |
| WO | WO 99/12330 A1 | 3/1999 |
| WO | WO 99/53627 | 10/1999 |
| WO | WO 00/07322 A2 | 2/2000 |
| WO | WO 01/43238 A1 | 6/2001 |
| WO | WO 01/71980 A1 | 9/2001 |
| WO | WO 02/065229 A2 | 8/2002 |
| WO | WO 02/091652 A2 | 11/2002 |
| WO | WO 02/102019 A2 | 12/2002 |
| WO | WO 2004/068827 A1 | 8/2004 |
| WO | WO 2005/022692 A2 | 3/2005 |

OTHER PUBLICATIONS

Universal Serial Bus Specification—Rev. 1.0, Jan. 15, 1996; Sec. 7.2.1-7.2.1.5 pp. 131-135.
Universal Serial Bus Specification—Rev. 1.0, Jan. 15, 1996; Sec. 9.2.1-9.2.5.1 pp. 170-171.
Universal Serial Bus Specification—Rev. 1.0, Jan. 15, 1996; Sec. 9.6.2 pp. 184-185.
Bearfield, J.M., "Control the Power interface of USB's Voltage Bus", Electronic Design, U.S., Penton Publishing, Clev. Ohio, vol. 45, No. 15, Jul. 1997, p. 80-86.
RAD Data Comm. Ltd., "Token Ring Design Guide", 1994, #TR-20-01/94, Chapters 1 through 4-21.
PowerDsine Product Catalogue 1999, pp. 56-79 and 95-105, Israel.
ITU-T 1.430 Integrated Services Digital Network—Basic User-Network Interface—Layer 1 Specification.
Gershon, E.; "FDDI on Copper with AMD PHY Components"; Advanced Micro Devices, Inc.; 1991, pp. 1-7.
Lavoisard, J.L. et al; "ISDN Customer Equipments"; Commutation and Transmission, No. 3, 1987, pp. 35-50.
Keller et al; "Performance Bottlenecks in Digital Movie Systems"; Proceedings of the 4th International Workshop on Network and Operating System Support for Digital Audio and Video, 1993, pp. 161-172.
Stallings, W.; "Local Networks—An Introduction" pp. ii, xii-xvi, 373-381, 1984.
Stallings, W.; "Local Networks—Second Edition" pp. I-v, viii-xiv, 427-434, 1987.
Stallings, W.; "Local Networks—Third Edition" pp. I-v, x-xvi, 499-510, 1990.
Strole, N.; "The IBM Token-Ring Network—A functional Overview"; ; IEEE Network Magazine, vol. 1, No. 1, 1987, pp. 23-30.
Willett, M.; "Token-ring Local Area Networks—An Introduction"; IEEE Network Magazine, vol. 1, No. 1, 1987, pp. 8 and 9.
"Integrated Services Digital Network (ISDN)", International Telecommunications Union, vol. III, Fascicle III.8, pp. 175-176 and 204-209, 1988.
An Interoperable Solution for FDDI Signaling Over Shielded Twisted Pair; Advanced Micro Devices, Inc.; May 1991, pp. 1-16.
SuperStack II Baseline Switch, 14-Port TP (3C16460) User Guide; 3Com; 1996 pp. 1-8.
SuperStack II Entry Hub User Guide; 3Com; 1996 pp. 1-8.
SuperStack II Baseline Switch 610 User Guide; 3Com; 1999, pp. 1-48.
SuperStack II Baseline 10/100 Switch User Guide; 3Com; 1998, pp. 1-8.
Cisco Catalyst 5000 Switching System; http://web/19961220170336/www.cisco.com; pp. 1-4, 1996.
Cisco Catalyst 5000 Series Documentation; http://web.archive.org/web/19961220192608/www.cisco.com; pp. 1-11, 1996.
Cisco Catalyst 5000 Group Switching Ethernet Modules; http://web.archive.org/web/19961220192604/www.cisco.com; pp. 1-5, 1996.
Cisco Catalyst 5000: Industry's First Modular, Multilayer-Capable Switching System for the Wiring Closet; http://web.archive.org/web/19961220192714/www.cisco.com; pp. 1-22, 1996.
Cisco Catalyst 5000 ATM Dual PHY LAN Emulation Module; http://web.archive.org/web/199612201914541/www.cisco.com; pp. 1-4, 1996.
Cisco LAN Emulation; http://web.archive.org/web/19961220192930/www.cisco.com; pp. 1-16, 1996.
Cisco Fast Ethernet 100-Mbps Solutions; http://web.archive.org/web/19961220192938/www.cisco.com; pp. 1-10, 1996.
Cisco Catalyst 5000: Industry's First Modular, Multilayer-Capable Switching System for the Wiring Closet; Cisco Systems, 1996, pp. 1-22.
3Com NBX 2101PE Basic Phone Product Details; http://www.3com.com/products/enUS/printsafe.jsp?sku=3C10248PE&pathtype=support; pp. 1-3.
Cisco Catalyst 5002 Switching System Data Sheet; Cisco Systems, 4 pages.
Cisco Catalyst 5000 Series; Cisco Systems, pp. 589-600.
Cisco Catalyst 5000 Group Switching Ethernet Modules Data Sheet; Cisco Systems, 9 pages.
Network Based Exchange—The Complete Communications Solution, NBX Corporation, 1997; 16 pages.
The Mac Reborn; Macworld, vol. 13, Issue 9, Sep. 1996, pp. 1-10.
SuperStack II Desktop Switch; 3Com, 1996, 2 pages.
CiscoPro Ether Switch CPW2115; Cisco Systems; 1995, 4 pages.
Hart Field Communication Protocol—an introduction for users and manufacturers; Hart Communication Foundation, 1995, 12 pages.
3ComImpactIQ External ISDN Modem; 3COM, 1996, 4 pages.
The Macintosh Reborn, Macworld—The Essential Macintosh Resource; 1996, 16 pages.
Cisco 2610 Router Cabling and Setup—Quick Start Guide; Cisco Systems, 1998, 18 pages.
Network Based Exchange—The Complete Communication Solution; NBX Corporation, 1997, 16 pages.
-48- Volt DC Power Supply Connection Guide, For the SuperStack II Switch 3900; Mar. 2000, pp. 1-9.
Donnan, et al; "Token Ring Access Method and Physical Layer Specifications"; ANSI/IEEE Standard for Local Area Networks; ANSI/IEEE 802.5; 89 pages, 1985.
Gibson et al; Fibre Data Distributed Interface (FDDI)—Token Ring Physical Layer Medium Dependent (PMD); American National Standard for Information Systems; ANSI X3.166-1990; 58 pages, 1990.
Gibson et al; Fiber Distributed Data Interface (FDDI)—Token Ring Physical Layer Protocol (PHY); American National Standard for Information Systems; ANSI X3.148-1988; 34 pages, 1988.
Lohse, et al; Fiber Distributed Data Interface (FDDI)—Token Ring Media Access Control (MAC); American National Standard for Information Systems; ANSI X3.139-1987; 62 pages; 1987.
IEEE Standard for a High Performance Serial Bus; IEEE Std. 1394-1995; 1996; 392 pages.
SuperStack II PS Hub User Guide; 3com; Jul. 1997; 188 pages.
SuperStack II Desktop Switch User Guide; 3Com; Jun. 1997; 148 pages.
Universal Serial Bus Specification Revision 1.0: Jan. 1996; 268 pages.
ComImpact IQ External ISDN Modem User Guide; Jul. 1997; 158 pages.
Stallings, W., Local Networks, An Introduction, pp. 1-97, 1984.
Grayson Evans, The CEBUs Standard User's Guide, 1st edition, May 1996, 317 pages.
Mark Hachman, Compaq to Ride the CEBus, EBN, Jan. 22, 1996, 1 page.
Home Automation Buses: Protocols Really Hit Home, EDN, Apr. 13, 1995, 9 pages.
Brian E. Markwalter, et al; CEBus Router Testing, IEEE Transactions on Consumer Electronics, Nov. 1991, vol. 37, No. 4, 8 pages.
Draft IS-60.04 Node Communications Protocol Part 6: Application Layer Specification, Rev. Apr. 18, 1996, 129 pages.

"The DSL Sourcebook", Paradyne Corporation, Copyright 2000, DSL-Book-3.0-0900, 98 pages.
Olshansky, "A Full Service Network for the Copper Plant", Telephony, 1985, pp. 52-60.
Instant Network Rules on Phone Lines, Electronic Design, 1987.
O. Agazzi, et al, Large Scale Integration of Hybrid-Mehtod Digital Subscriber Loops, IEEE Transactions on Communications, vol. COM-30, No. 11, Sep. 1982, pp. 2095-2108.
S.V. Ahamed, et al., "A tutorial on Two-Wire Digital Transmission in the Loop Plant", IEEE Transactions on Communications, vol. COM-29, No. 11, Nov. 1991, pp. 1554-1564.
S.B. Andrews, "The Generic Digital Channel Concept", IEEE International Conference on Communications, 1985, Jun. 23-26, 1985, Chicago, IL, pp. 7.1.1-7.1.3.
G.W. Beene, "Design Considerations for a CO-Powered Distributed-Drop PCM Station Carrier", IEEE Transactions on Communications, vol. COM-30, No. 9, Sep. 1982, pp. 2022-2028.
A. Bienz, "1+1=1—Order Das Telefonnetz Als Datennetz", Sysdata, vol. 16, Aug. 28, 1985, pp. 41-42.
A. Brosio, et al., "A Comparison of Digital Subscriber Line Transmission Systems Employing Different Line Codes", IEEE Transactions on Communications, vol. COM-29, No. 11, Nov. 1981, pp. 1581-1588.
T.P. Byrne, et al., "Positioning the Subscriber Loop Network for Digital Services", IEEE Transactions on Communications, vol. COM-30, No. 9, Sep. 1982, pp. 2006-2011.
R.G. Cornell, et al., "Progress Towards Digital Subscriber Line Services and Signaling", IEEE Transactions on Communications, vol. COM-29, No. 11, Nov. 1981, pp. 1589-1594.
S. Davis, "Integrating Voice and Data: A Marriage of Convenience", Today's Office, vol. 24, No. 9, Feb. 1990, pp. 28-30.
M. Devault, et al., "Resaux Domestiques et Terminaux Audiovisuels Numeriques", L'Echo Des Recherches, No. 126, 1986, pp. 37-46.
H. Fuchs, et al., "Providing Full Duplex Transmission Over Two-Wire Subscriber Loops", Telephony, vol. 208, No. 11, Mar. 18, 1985, pp. 76, 77, 78 and 84.
H. Fukagawa, et al., "Bus Wiring System for Residences", Matsushita Electric Works Technical Report, No. 36, Feb. 1988, pp. 31-35.
D. Glick, et al., "Providing Telco Customers Continuous Data Services", Telephony, vol. 205, No. 22, Nov. 1983, pp. 46, 50, 51, 54.
J.B. Hughes, et al., "A Receiver IC for a 1+1 Digital Subscriber Loop", IEEE Journal of Solid State Circuitry, vol. S.C. 20, No. 3, Jun. 1985 pp. 671-678.
R. Jelski, "Subscriber Subcarrier System—A New Life," Communications International, vol. 4, No. 5, May 1977, pp. 29-30.
AJ. Karia, et aL, "A Digital Subscriber Carrier System for the Evolving Subscriber Loop Network", IEEE Transactions on Communications, vol. COM-30, No. 9, Sep. 1982, pp. 2012,2014,2015.
T. Masuda, et al., "2-Wire Video Intercom System with Telephone", National Technical Report, vol. 37, No. 6, Dec. 1991, pp. 74-80.
T. Matthews, "Telecomm System is Nerve Center", Infosystems, vol. 31, No. 5, May 1984, pp. 68-69.
J. K. Merrow, "A New Approach to Integrating Local Area Data and Voice Transmission," Telephony, vol. 250, No. 17, Oct. 1983, 2 pages.
H. Morgan, "Two-Wire Full-Duplex Modem Simplifies Voice and Data Networking", Mini-Micro Systems, vol. 17, No. 3, Mar. 1984, 4 pages.
R Murakoshi, "Home Automation", Journal of the Society of Instrument and Control Engineers, vol. 23, No. 11, Nov. 1984, pp. 955-958.
RD. Nash, et al., "Simultaneous Transmission of Speech and Data Over An Analog Telephone Channel", GLOBECOM '85, IEEE Global Telecommunications Conference. Conference Record. Communication Technology to provide New Services, Dec. 25, 1985, New Orleans, Louisiana, pp. 4.2.1-4.2.4.
H. Ogiwara, et al., Design Philosophy and Hardware Implementation for Digital Subscriber Loops, IEEE Transactions on Communications, vol. COM-30, No. 9, Sep. 1982, pp. 2057-2065.
J.L. Pernin, "Related Evolution of Subscriber Loop Plant and Residential Data Transmission Needs", Intelcon 79 Exposition Proceedings, Feb. 26-Mar. 2, 1979, Dallas, Texas, pp. 596-599.

Ra Tatum, "Project Victoria—the 7-in-1 Solution", Telephone Engineer and Management, vol. 90, No. 1, Jan. 1, 1986, pp. 47 and 50.
A Teshima, et al., "Still Video Telecommunication Over the Analog Telephone Network", Journal of the Institute of Television Engineers of Japan, vol. 42, No. 11, Nov. 1988, pp. 1162-1167.
S.R. Treves, et aL"Text, Image and Data Integration in a Distributed Control Digital Voice Switching System", International Switching Symposium—ISS '81 CIC, Sep. 21-25, 1981, Montreal, Quebec, Canada, pp. 1-7.
1. Tsuda, et al., "Experimental In-House Multiservice Communication System", Fujitsu Scientific and Technical 35 Journal, vol. 16, No. 3, Sep. 1980, pp. 29-45.
K. Urui, "Integrated Voice/Data Digital EPBX", Toshiba Review, No. 150, Winter 1984, pp. 30-33.
A.F. Van Den Berg, et al., "Principles van de Modem: Technieken en Specificaties", Elektronica, vol. 32, No. 5, Mar. 9, 1984, pp. 11,13,15,17,19 and 21.
M.G. Vry, et al., "Digital 1+1 Systems for Local Network Enhancement", Conference on Communications Equipment and Systems, Apr. 20-22, 1982, Birmingham, United Kingdom, pp. 61-64.
M.G. Vry, et al., "The Design of a 1+1 System for Digital Signal Transmission to the Subscriber", NTG-Bachberichte, vol. 73, 1980, pp. 36-40.
J.A. Webb, "A New Concept in Data-Above-Voice (DAV)", PTC '86: Evolutions of the Digital Pacific. Telecommunications—Asia, Americas, Pacific: PTC '86 Proceedings, Jan. 12-15,1986, Honolulu, Hawaii, pp. 260-265.
K. Yamamoto, "A Home Terminal System Using the Home Area Information Network", IEEE Transactions on Consumer Electronics, vol. CE-30, No. 4, Nov. 1984, pp. 608-616.
"Centrex LAN Can Provide Advanced Network Capabilities Over the Existing Telephone Wires", Communications News, vol. 25, No. 6, Jun. 1988, p. 27.
"Data Over Voice is Solution for Corporate Network", Telephone Engineer and Management, vol. 91, No. 9, May 1, 1987, pp. 67-69.
"Data Carrier System Allows Simultaneous Voice/Data Transmission for PABX Telephone Systems", Computer Design, vol. 21, No. 5, May 1982, pp. 68 and 70.
"Computerized Telephone System Integrates Voice and Data Switching", Computer Design, vol. 20, No. 4, Apr. 1981, 6 pages.
"AT&T's Systemax Premises Distribution System Solves Networking Problems", Fiber Optics Magazine, vol. 12, No. 4, Jul.-Aug. 1990, pp. 14-16.
M.M. Anderson, "Video Services on Copper", Conference: ICC 91, International Conference on Communications Conference Record, Jun. 2-26, 1991, Denver, CO, pp. 302-306.
M. Bastian, "Voice-Data Integration: An Architecture Perspective," IEEE Communications Magazine, vol. 24, No. 7, Jul. 1986, pp. 8-12.
M. Boubekker, "Bandwidth Reduction for the Transmission of Sign Language Over Telephone Lines", Proceedings of the SPIE—The International Society for Optical Engineering, vol. 1001, Part. 1, 1988, pp. 223-230.
S. Bramblett, "Connect Terminals to Your CPU Over PBX Telephone Lines", EDN, vol. 31, No. 5, Mar. 6,1986, pp. 239-243, 245, 246 and 248.
G.D. Carse, "New and Future Technologies in the Local Telephone Network: The Victoria System", Conference: IEEE International Conference on Communications '86, ICC '86: Integrating the World Through Communications D Conference Record, Jun. 22-25, 1986, Toronto, Ontario, Canada, pp. 410-412.
C. Dougugeris, et al., "Communications and Control for a Home Automation System", Conference: IEEE Proceedings of the Southeastcon '91, vol. 1, pp. 171-175, 1991.
D.G.J. Fanshawe, "Architures for Home Systems", Conference: IEEE Colloquium on Home Systems—Information, Entertainment and Control, Oct. 1, 1990, London, United Kingdom, pp. 3/1-3/3.
N.C. Hightower, "Integrated Voice, Data and Video in the Local Loop", IEEE 1986, pp. 915-919.
M. Inoue, et al., "A Home Automation System", IEEE Transactions on Consumer Electronics, vol. CE-31, No. 3, Aug. 1985, pp. 516-527.
S. Motoyama, et al., "A Subscriber Loop Multiplexing System for Integrated Service Digital Networks", Conference: NTC '81, IEEE 1981 National Telecommunications Conference Innovative Telecommunications—Key to the Future, Nov. 29-Dec. 3, 1981, New Orleans, Louisiana, pp. D5.1.1-D5.1.5.

G. Neumann, Flexible and Cost-Minimising System Concept (Ericsson Digital PABX MD 110), NET Nechrichten Elektronik-Telematik, Special Issue, Mar. 1988, pp. 11,12,14 and 15.

H. Nishi, et al., "Control of a Star/Bus Key Telephone System", NTT R&D, vol. 39, No. 8, 1990, pp. 122, 1222, 1224-1228.

A. Pietrasik, et al., "Subscriber Carrier Telephony System 1+1", Wiadomosci Telekomunikacyjne, vol. 17, No. 7-8, Jul.-Aug. 1977, pp. 183-198.

V. Punj, "Broadband Applications and Services of Public Switched Networks", IEEE Transactions on Consumer Electronics, vol. 35, No. 2, May 1989, pp. 106-112.

T. Sodeyama, et al., "Intelligent House", Journal of the Institute of Electronics, Information and Communication Engineers, vol. 72, No. 9, Sep. 1989, pp. 1024-1026.

H. Tanaka, et al., "Telecontrol System VJ-501", National Technical Report, vol. 32, No. 6, Dec. 1986, pp. 809-817.

K. Yamamoto, et al., "New Home Telephone System Using Japanese Home Bus System Standard," IEEE Transactions on Consumer Electronics, vol. 35, No. 3, Aug. 1989, pp. 687-697.

T. Yamazakli, et al., "Home Appliance Technologies," NEC Research and Development, No. 96, Mar. 1990, pp. 292-299.

Funkschau, "CEBus: US Households are Being Networked", No. 9, Apr. 1989, pp. 45-47.

"Shared Services (DataNoice Network)", Communications News, vol. 25, No. 11, Nov. 1988, pp. 46-47.

Freeman, "Telecommunication Transmission Handbook", 2.sup.nd Ed., Cover, 1981, pp. xi-xxvii, Chapter 3 (pp. 79-127), Chapter 5 (pp. 172-252), Chapter 6 (pp. 253-288).

A. Artom, et al., "The Possible Use of Customer Loop for New Services During The Transition From Analogue To Digital", Revue F.I.1.C.E., Mar.-Apr. 1981, vol. 20, No. 2, pp. 50-56.

A. Artom, et al., "Medium-Term Prospects for New Servies to the Telephone Customers," Conference Record, Jun. 14-18, 1981, Int'l Conf. On Communications, Denver, CO., pp. 14.4.1-14.4-6.

Hoe-Young Noh, "Home Automation", Korea Information Science Society Review, Apr. 1989, vol. 7 No. 2, pp. 40-44, Republic of Korea. (Translation Provided).

M. Coronaro, et aL, "Integrated Office Communication System," Electrical Communication, 1986, pp. 17-22, vol. 60, No. 1, FACE Research Center, Pomezia, Italy.

Chow, et aL, "A Multi-drop In-House ADSL Distribution Network"; IEEE 1994, pp. 456-460.

English Language Abstract for Japanese Patent 1-27358 (64-27358) Jan. 30, 1989.

Bellcore: Request for Information: Asymmetrical Digital Subscriber Line (ADSL) Systems That Support Simplex High-Bit-Rate Access and POTS In The Copper Loop Plant; Jun. 1991.

Compaq to Ride the CEBus; by Mark Nachman, EBN Jan. 22, 1996 (1 page).

CEBus Router Testing; IEEE Transactions on Consumer Electronics Nov. 1991, vol. 37 No. 4 (8 pages).

Broadband Network Technology—An Overview for the Data and Telecommunications Industries; by Edward Cooper, Copyright 1984, p. 51-52 (4 pages).

Technical Report TR-001 ADSL Forum System Reference Model; May 1996 (6 pages).

DSLPipe User's Guide; by Ascend Communications, Jun. 3, 1997 (245 pages).

DSLPipe Reference Guide; by Ascend Communications, Jun. 2, 1997 (162 pages).

Ascend DSLPipe-S Features; Posted May 12, 1997 (2 pages).

Broadband Digital Subscriber Line—A Full Service Network for the Copper Plant; Telephony I Jun. 12, 1995, vol. 228 No. 24 (8 pages).

Commtek Intros Video over UTP; Communications Week, Feb. 10, 1992 (3 pages).

Aurelio Amodei, et al., "Increasing the Throughput of the HomePNA MAC Protocol, IEEE, Proceedings of the 29th Annual IEEE International Conference on Local Computer Networks (LCN '04), 8 Pages", Nov. 1, 2004,8 pages (s), None.

"Home Phoneline Networking Alliance", Interface Specification for HomePNA 2.0 10M8 Technology Link Layer Protocol, (Dec. 1, 1999), pp. 1-39.

"Home Phoneline Networking Alliance", Interface Specification for HomePNA 2.0 10M8 Technology, (Dec. 1, 1999), pp. 1-77.

Paola Bisaglia, et al., Receiver Architectures for HomePNA 2.0 , Hewlett Packard Laboratories, Bristol, U.K., Oct. 17, 2001.

Loh, L.; Ozturk, Y.; Quality of Support and Priority Management in HomePNA 2.0 Link Layer.quadrature..quadrature. Computers and Communication; Jun. 30-Jul. 3, 2003. (ISCC 2003). Proceedings. Eighth IEEE International D Symposium; pp. 861-866 vol. 2.

Phoneline| HPNA| HomePNA Networks, http://www.homenethelp.com/web/howto/HomeNet-HPNA.asp (visited Jul. D 29, 2003) (3 pages).

Anonymous, HomePNA Specification 1.0 Field Tests Status, Mar. 1999, Home Phoneline Networking Alliance, Inc, pp. 1-6.

21145 Phoneline/Ethernet LAN Controller, Intel Corporation .COPYRGT. 1999, http://developer.intel.com/design/network/21145.htm.

Simple, High-Speed Ethernet Technology For The Home, White Paper, Home Phoneline Networking Alliance, Jun. 1998, pp. 1-11.

Information on Home PhoneLine Networking Alliance (Home PNA), dated Jun. 1998 and before.

Claim Chart presented in request for reexamination of U.S. Patent No. 6,480,510 request filed Jun. 10, 2009.

Claim Chart presented in request for reexamination of U.S. Patent No. 5,841,360 request filed May 26, 2009.

C. Valenti, "Study of the Feasibility and Advisability of Digital Subscriber Lines Operating at Rates Substantially in Excess of the Basic Access Rate", T1E1.R Technical Subcommittee (T1E1.4/91-115), pp. 2 and 4; Aug. 26, 1991.

Ascend DSLPipe-S Specifications; copyright 1997, (2 pages).

D. L. Waring, "The Asymmetrical Digial Subscriber Line (ADSL): A New Transport Technology for Delivering Wideband Capabilities to the Residence", Globecom '91, IEEE, pp. 1979-1986.

Twisted Pair Physical Layer and Medium Specification: Revision: IS 60, Aug. 18, 1995 (49 pages).

TeleConcepts . . . Introduces the Just Plug It In Intercom System, TeleConcepts Brochure, Newington, CT, 2 pages, published before Jul. 3, 1995.

TeleVideo Brochure, 2 pages, published before Jul. 3, 1995.

Introduction to the CEBus Standard; Revision.Feb. 5, 1995 Draft Copy (19 pages).

"Video Transmission System—Send Video Over Ordinary Wire—No Coax Required", Javelin Brochure, 2 pages, published before Jul. 3, 1995.

J. Hofmann, Cable, Television, and the Consumer Electronic Bus, Symposium Record, 15th International TV Symposium, Jun. 11, 1987, Montreux, Switzerland.

J.W. Lechleider, "Study of the Feasibility and Advisability of Digital Subscriber Lines Operating at Rates Substantially in Excess of the Basic Access Rate", T1E1.4 Technical Subcommittee (T1E1.4/89-070), 1 page, 1998.

J. Alves, "Data over Voice—A Low Cost LAN Alternative", Communications Show and Conference, MEOOM 87, Jan. 1987, pp. 13-15.

Office Action: Binder 22B dated Nov. 27, 2009.

Office Action-Final Rejection: Binder 22B dated Jul. 22, 2010.

Office Action dated Nov. 27, 2009: U.S. Appl. No. 12/016,324; 137 pages.

Office Action dated Jul. 22, 2010: U.S. Appl. No. 12/016,324; 101 pages.

ADDRESSABLE OUTLET, AND A NETWORK USING THE SAME

CROSS-REFERENCE TO RELATED APPLICATION

This application is a continuation of U.S. application Ser. No. 10/491,989, filed on Apr. 7, 2004, the disclosure of which is incorporated herein by reference

FIELD OF THE INVENTION

The present invention relates to the field of wired Local Area Networks (LAN's) using outlets, and, more specifically, to an addressable outlet for use in such networks.

BACKGROUND OF THE INVENTION

Outlets

The term "outlet" herein denotes an electro-mechanical device, which facilitates easy, rapid connection and disconnection of external devices to and from wiring installed within a building. An outlet commonly has a fixed connection to the wiring, and permits the easy connection of external devices as desired, commonly by means of an integrated connector in a faceplate. The outlet is normally mechanically attached to, or mounted in, a wall. Non-limiting examples of common outlets include: telephone outlets for connecting telephones and related devices; CATV outlets for connecting television sets, VCR's, and the like; and electrical outlets for connecting power to electrical appliances. The term "wall" herein denotes any interior or exterior surface of a building, including, but not limited to, ceilings and floors, in addition to vertical walls.

LAN Environment

FIG. 1 shows a typical prior art LAN environment 10. Such a network commonly uses 10BaseT or 100BaseTX Ethernet IEEE802.3 interfaces and topology, and features a hub 11 as a concentrating device, into which all devices are connected. Devices are connected to the hub 11 by data connectors 14a, 14b, and 14c, which are housed within network outlets 15a, 15b, and 15c respectively. Connections to the hub 11 are via cables 13a, 13b, and 13c respectively. Data connectors 14a, 14b, and 14c may be, for example, type RJ-45 connectors; and cables 13a, 13b, and 13c may be, for example, Category 5 cabling. The data portion of network 10 uses data units (which may be computers) 7a, 7b, and 7c, which connect to network connectors 14a, 14b, and 14c via cables 16a, 16b, and 16c, respectively. A server 12 may also be connected to the hub 11, and can perform the external connection functionality, as well as other server functions as applied in the art.

Although FIG. 1 refers to the hub 11 as a concentrating device, it is to be understood that any type of device having multiple network interfaces and supporting a suitable connectivity can be used, non-limiting examples of which include shared hubs, switches (switched hubs), routers, and gateways. Hence, the term "hub" herein denotes any such device without limitation. Furthermore, network 10 can be any packet-based network, either in-building or distributed, such as a LAN or the Internet.

The topology of network 10 as shown in FIG. 1 incurs various maintenance difficulties. The wiring from the hub 11 to the data unit 7a, for example, includes wire 13a, connector 14a and wire 16a. Because these conductors are continuous, there is no easy way to distinguish a break or short-circuit in wire 13a from a break or short-circuit in wire 16a, nor from a break or short-circuit in connector 14a. Troubleshooting such failures requires disconnecting cables and inserting dedicated test equipment or making elaborate and thorough substitutions of components that are known to be functional. Such procedures are complicated, labor-intensive, time-consuming, and expensive. Furthermore, in the common case of an outlet to which no data unit is connected, there is no simple way to test the continuity of wiring from the hub to the outlet. In addition, in many cases it is necessary to test the LAN from a remote place (such as via the Internet) in cases where it is not possible to attach testing equipment to non-connected outlets.

Discussion of network management and example of network management system are part of U.S. Pat. No. 5,812,750 to Dev et al.

Home Networking

Most existing offices and some of the newly built buildings facilitate the network structure of network 10. However, implementing such a network in existing buildings typically requires installation of new wiring infrastructure. Such installation of new wiring may be impractical, expensive and hassle-oriented. As a result, many technologies (referred to as "no new wires" technologies) have been proposed in order to facilitate a LAN in a building without adding new wiring. Some of these techniques use existing wiring used also for other purposes such as telephone, electricity, cable television, and so forth. Doing so offers the advantage of being able to install such systems and networks without the additional and often substantial cost of installing separate wiring within the building. In order to facilitate multiple use of wiring within a building, specialized outlets are sometimes installed, which allow access to the wiring for multiple purposes. An example of home networking over coaxial cables using outlets is described in WO 02/065229 published 22 Aug., 2002 entitled: 'Cableran Networking over Coaxial Cables' to Cohen et al.

The use of such wiring for additional purposes creates a need for ways of easily determining the condition of the wiring and obtaining this information remotely.

Home networking using existing telephone lines will be described as an example.

Definitions and Background

The term "telephony" herein denotes in general any kind of telephone service, including analog and digital service, such as Integrated Services Digital Network (ISDN).

Analog telephony, popularly known as "Plain Old Telephone Service" ("POTS") has been in existence for over 100 years, and is well-designed and well-engineered for the transmission and switching of voice signals in the 3-4 KHz portion (or "band") of the audio spectrum. The familiar POTS network supports real-time, low-latency, high-reliability, moderate-fidelity voice telephony, and is capable of establishing a session between two end-points, each using an analog telephone set.

The terms "telephone", "telephone set", and "telephone device" herein denote any apparatus, without limitation, which can connect to a Public Switch Telephone Network ("PSTN"), including apparatus for both analog and digital telephony, non-limiting examples of which are analog telephones, digital telephones, facsimile ("fax") machines, automatic telephone answering machines, voice modems, and data modems.

The terms "data unit", "computer" and "personal computer" ("PC") as used herein include workstations and other data terminal equipment (DTE) with interfaces for connection to a local area network In-home telephone service usually employs two or four wires, to which telephone sets are connected via telephone outlets.

Home Networking over Telephone Lines.

FIG. 2 shows the wiring configuration of a prior-art telephone system including a network 20 for a residence or other building, wired with a telephone line 5, which has a single wire pair that connects to a junction-box 34, which in turn connects to a Public Switched Telephone Network (PSTN) 39 via a cable 33 ('local loop'), terminating in a public switch 32, which establishes and enables telephony from one telephone to another. The term "high-frequency" herein denotes any frequency substantially above such analog telephony audio frequencies, such as that used for data. ISDN typically uses frequencies not exceeding 100 KHz (typically the energy is concentrated around 40 KHz). The term "telephone line" herein denotes electrically-conducting lines which are intended primarily for the carrying and distribution of analog telephony signals, and includes, but is not limited to, such electrically-conducting lines which may be pre-existing within a building and which may currently provide analog telephony service.

Junction box 34 separates the in-home circuitry from the PSTN and is used as a test facility for troubleshooting as well as for new wiring in the home. A plurality of telephones may connect to telephone lines 5 via a plurality of telephone outlets. Each outlet has a connector (often referred to as a "jack"), commonly being in the form of RJ-11 connectors in North-America. Each outlet may be connected to a telephone unit via a compatible "plug" connector that inserts into the jack.

Wiring 5 is usually based on a serial or "daisy-chained" topology, wherein the wiring is connected from one outlet to the next in a linear manner; but other topologies such as star, tree, or any arbitrary topology may also be used. Regardless of the topology, however, the telephone wiring system within a residence always uses wired media: two or four copper wires terminating in one or more outlets which provide direct access to these wires for connecting to telephone sets.

It is often desirable to use existing telephone wiring simultaneously for both telephony and data networking. In this way, establishing a new local area network in a home or other building is simplified, because there is no need to install additional wiring.

The concept of frequency domain/division multiplexing (FDM) is well-known in the art, and provides means of splitting the bandwidth carried by a wire into a low-frequency band capable of carrying an analog telephony signal and a high-frequency band capable of carrying data communication or other signals. Such a mechanism is described, for example, in U.S. Pat. No. 4,785,448 to Reichert et al. (hereinafter referred to as "Reichert"). Also widely used are xDSL systems, primarily Asymmetric Digital Subscriber Loop (ADSL) systems.

Examples of relevant prior-art in this field are the technology commonly known as HomePNA (Home Phoneline Networking Alliance), WO 99/12330 to Foley and as disclosed in U.S. Pat. No. 5,896,443 to Dichter (hereinafter referred to as "Dichter"). Dichter and others suggest a method and apparatus for applying a frequency domain/division multiplexing (FDM) technique for residential telephone wiring, enabling the simultaneous carrying of telephony and data communication signals. The available bandwidth over the wiring is split into a low-frequency band capable of carrying an analog telephony signal, and a high-frequency band capable of carrying data communication signals. In such a mechanism, telephony is not affected, while a data communication capability is provided over existing telephone wiring within a home.

In addition to illustrating a residential telephone system, FIG. 2 also shows the arrangement of a Dichter network. Network 20 serves both analog telephones and provides a local area network of data units. Data Terminal Equipment (DTE) units 7a, 7b, 7c and 7d are connected to the local area network via Data Communication Equipment (DCE) units 25a, 25b, 25c and 25d, respectively. Examples of Data Communication Equipment include, but are not limited to, modems, line drivers, line receivers, and transceivers (the term "transceiver" herein denotes a combined transmitter and receiver), which enables data communication over the high spectrum of telephone line 5. DCE units ('phoneline modems') 25a, 25b, 25c and 25d are respectively connected to high pass filters (HPF) 24a, 24b, 24c and 24d, which allow access to the high-frequency band carried by telephone line 5. In order to avoid interference to the data network caused by the telephones, low pass filters (LPF's) 23a, 23b, 23c and 23d are added to isolate the POTS carrying band, so that telephones 26a, 26b, 26c and 26d connects to telephone line 5 for providing PSTN. Furthermore, a low pass filter may also be connected to Junction Box 34 (not shown in the figure), in order to filter noise induced from or input to PSTN wiring 33.

WO 01/71980 published Sep. 27, 2001 entitled "Telephone Outlet and System for a Local Area Network Over Telephone Lines" in the name of the present inventor and assigned to the present assignee, describes the integration of DCE 25, HPF 24, and LPF 23 components into outlets 21 in order to reduce complexity, as shown in FIG. 2. This allows direct connection of telephone sets 6a, 6b, 6c, and 6d to outlets 21a, 21b, 21c, and 21d, respectively, via dedicated connectors (as is done in prior-art common telephone outlets), as well as direct and easy connection of data units 7a, 7b, 7c, and 7d to the respective outlets via dedicated jacks, as is usually done in LAN systems (as shown in FIG. 1).

The topology of network 20 as shown in FIG. 2 exhibits the maintenance difficulties previously discussed. The data flow from data unit 7a to data unit 7b, for example, is via wiring 16a, wiring 5b and wiring 16b, as well as connectors such as 22a and 22b. Having continuous data flow, there is no easy way to distinguish a short-circuit in wiring 16a from a short-circuit in wiring 16b, or from a short-circuit in wiring 5b, or from a short-circuit in any of the interim connectors. Similarly, a break in the wiring cannot be easily or remotely isolated to wiring 16a or wiring 16b. Troubleshooting any of the above failures can only be accomplished by trial and error and requires disconnecting cables 16a, 16b, 16c, and 16d, and inserting other data units to the outlets. If the failure, however, is in wiring 5c, more troubleshooting will be necessary, and can ultimately involve disconnecting the entire network. As noted above, this is a complicated, expensive, labor-intensive, and time-consuming effort. Furthermore, in the common case of an outlet into which no data units are connected, there is no simple way to test wiring continuity to the outlet. In addition, as explained in WO 99/03255 to Bell, in many cases it is required to test the LAN from a remote place (e.g. via the Internet), and no local presence is available to approach the disconnected outlets for attaching testers.

U.S. Pat. No. 4,787,082 entitled Data flow control arrangement for local area network (Delaney et al.) published Nov. 22, 1988 discloses a local data distribution network wherein a plurality of bi-directional data distribution busses are each connected to a bus master control circuit at a terminal end of the bus. Connected to each of the data distribution busses are a plurality of passive outlets to which intelligent connectors or stations may be connected. Each station has a unique address and is utilized for individually coupling data processing devices to the bus. A bus termination hub switching facility cooperates with the included group of bus master control circuits to interconnect data processing stations on the various busses. The bus termination hub facility includes bus monitoring, status polling and maintenance facilities. A faulty bus is disconnected if a fault is discovered during monitoring intervals. It remains disconnected until the fault is corrected.

JP 55132197A2 published Oct. 14, 1980 in the name of Sharp Corporation and entitled "Unit Controlling Electric Equipment Making Use of House Wiring" relates to the control of electrical equipment connected to house wiring. An address information signal is sent through a coupling unit from a transmission controller to house wiring. On the reception side, reception controllers receive the address information signal through coupling units inserted into sockets provided at respective positions of the house wiring. From one of controllers whose incorporated address information agrees with the received address information, answer information is sent back to the transmission side. On the transmission side, an operation command code is sent out upon receiving the answer information from the reception side so as to control electric equipment.

In both above prior art patents, passive outlets are used, hence there is no way to distinguish between a failure in the wiring into which the outlets are connected, and a failure in the wiring/equipment connected to the outlet.

There is thus a widely recognized need for, and it would be highly advantageous to have, a method and system for allowing remote diagnosis of LAN environment outlets without requiring local access to the network and without dismantling the network. This goal is met by the present invention.

SUMMARY OF THE INVENTION

It is an object of the present invention to allow convenient determination of the status of installed wiring within a building, and the outlets and connectors thereto.

It is a further object of the present invention to allow convenient determination of the condition of devices and apparatus connected to the various outlets of an installed wiring system. It is moreover an object of the present invention to permit such determination remotely.

In order to attain these objectives, the present invention provides an outlet having an address which uniquely identifies the outlet within an information network that is established, at least in part, over wiring to which the outlet is connected. Associated with this unique network address is processing circuitry and an addressing unit capable of storing and utilizing the unique network address, to allow the outlet to receive and send messages associated with the address. The processing circuitry interfaces with the network to support such messaging, and may generate content for messages to be sent to other devices on the network, and may likewise receive and process messages sent to the outlet from other devices. The unique network address is associated with both the sending and receiving of messages over the network. In the case of receiving messages, the unique address allows the circuitry in the outlet to discriminate between messages intended for that outlet and messages intended for other devices. In the case of sending messages, the unique address serves to identify the source of the message. Because addresses are associated both with senders and receivers, the processing circuitry may respond to messages sent to the outlet from other devices by sending messages from the outlet to other devices.

Outlets according to the present invention include, but are not limited to, electrical power outlets, telephone outlets, and cable television outlets.

The term "information network" herein denotes any system that allows multiple devices to send and receive information of any kind, wherein each device may be uniquely identified for purposes of sending and receiving information. Information networks include, but are not limited to, data networks, control networks, cable networks, and telephone networks. A data network utilizing outlets according to the present invention can be a local area network (LAN) or part of a wide-area network, including the Internet.

Therefore, according to the present invention there is provided an outlet for use with wiring installed in a building, and having at least one address that uniquely identifies the outlet within an information network.

BRIEF DESCRIPTION OF THE DRAWINGS

The invention is herein described, by way of non-limiting example only, with reference to the accompanying drawings, wherein.

DESCRIPTION OF THE INVENTION

Figure 1:
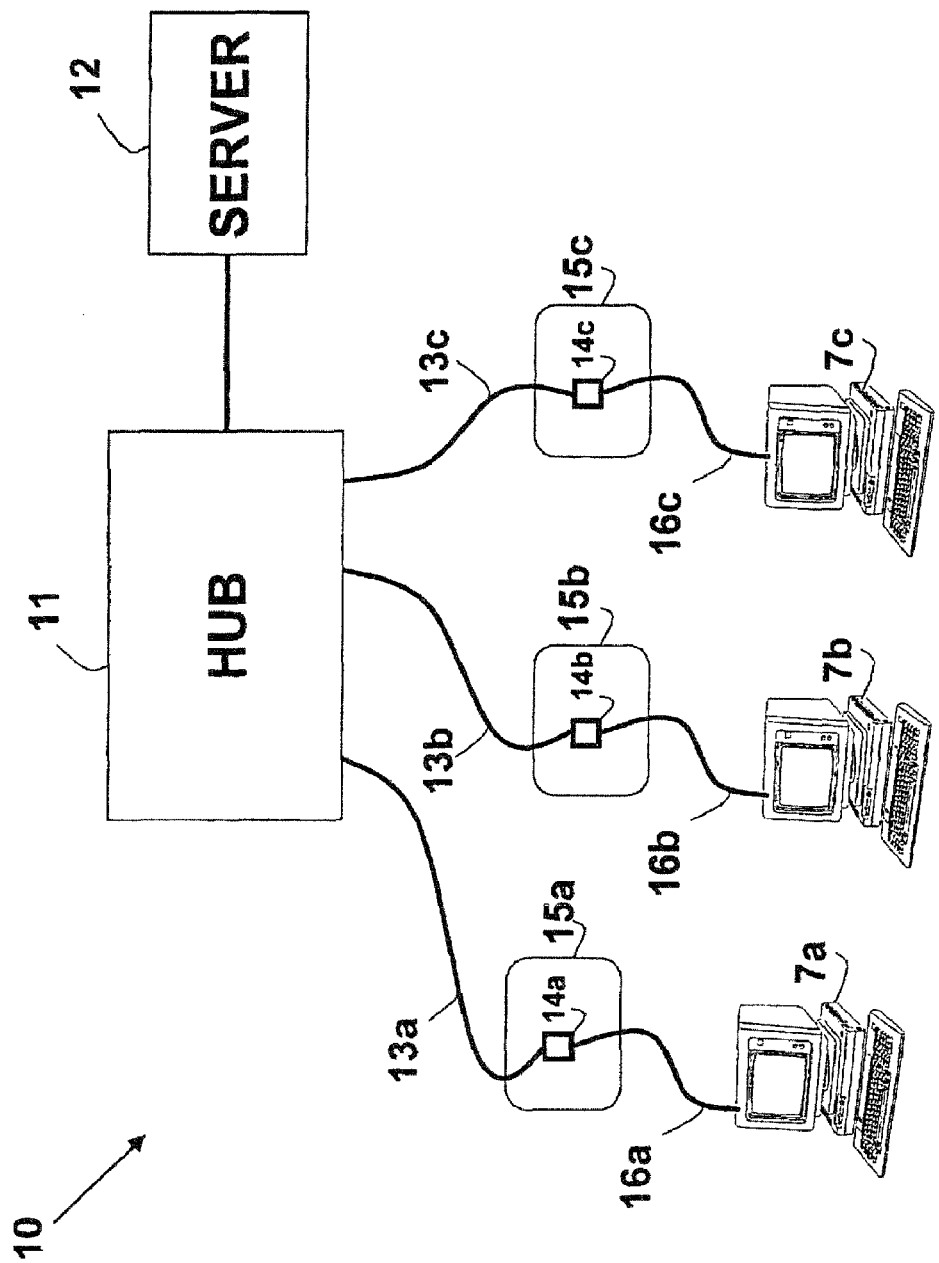
FIG. 1 shows a prior art local area network.
Figure 2:
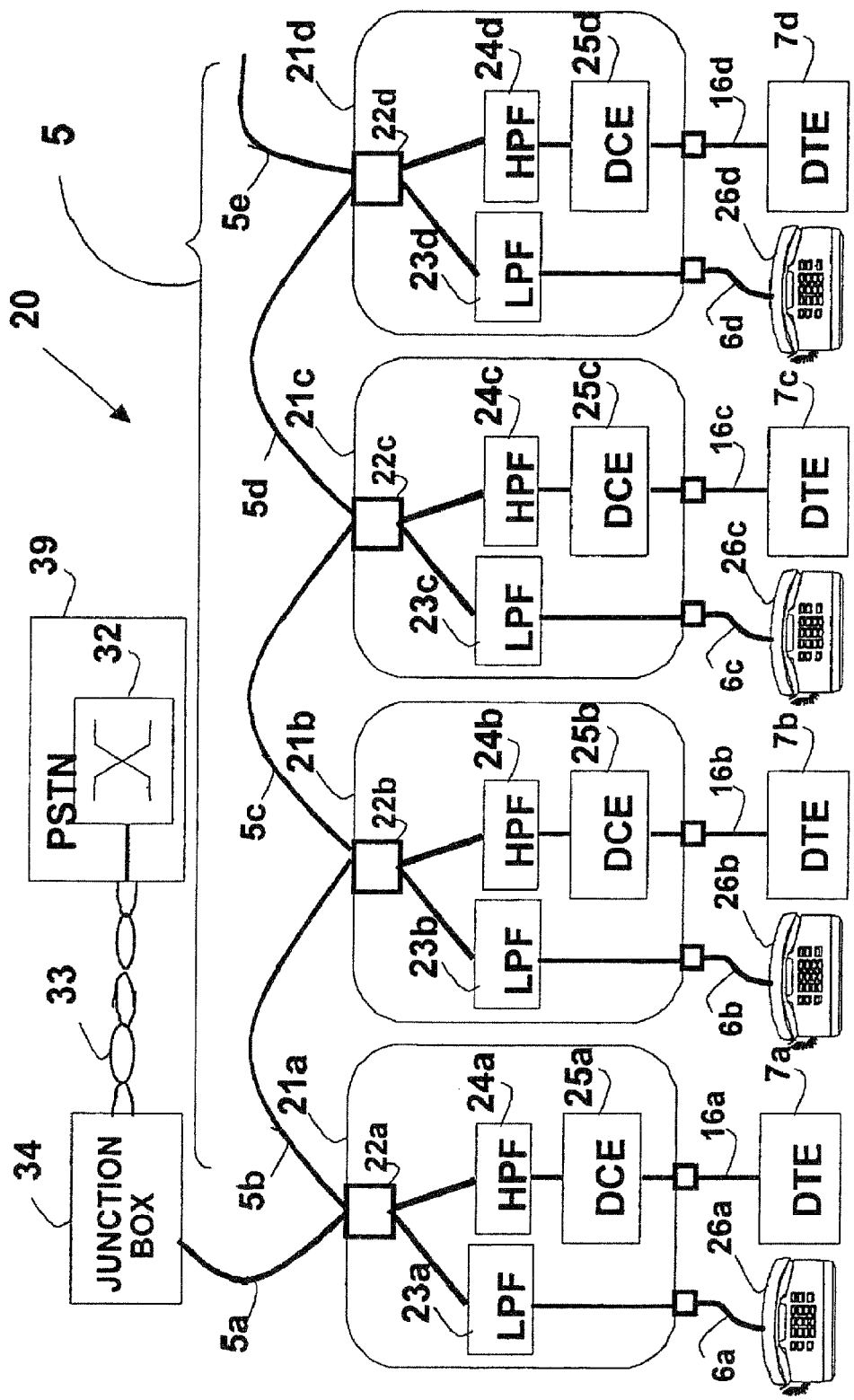
FIG. 2 shows a prior art local area network over telephone lines.

The principles and operation of a network according to the present invention may be understood with reference to the drawings and the accompanying description. The drawings and descriptions are conceptual only. In actual practice, a single component can implement one or more functions; alternatively, each function can be implemented by a plurality of components and circuits. In the drawings and descriptions, identical reference numerals indicate those components that are common to different embodiments or configurations.

Figure 3:
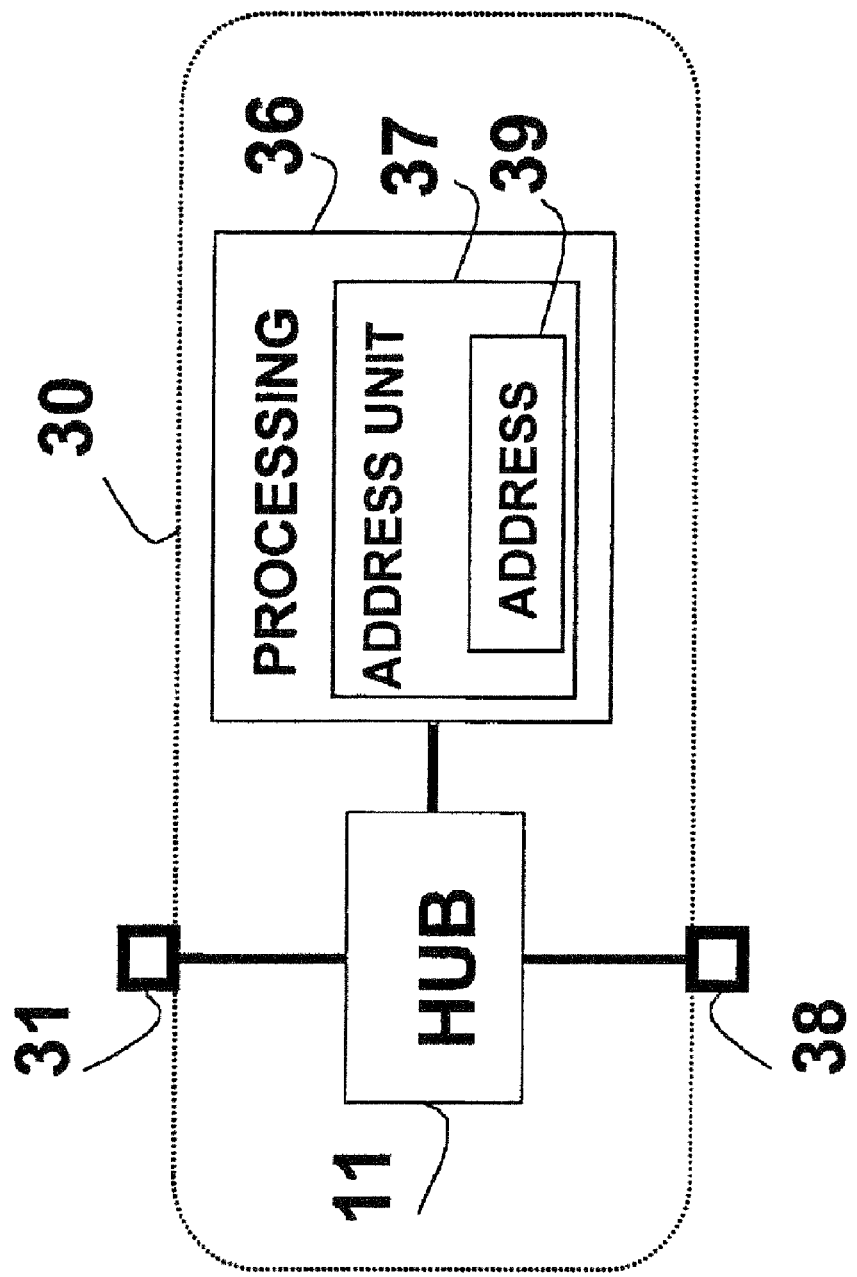
FIG. 3 shows a local area network outlet according to the present invention.

FIG. 3 schematically shows an outlet 30 according to a first embodiment of the invention. As shown in FIG. 3, outlet 30 includes a three-port hub 11. One port goes to a connector 31, which connects the outlet 30 to network wiring as previously described, and as is known in the art (such as to wiring 13*a* in FIG. 1). Another hub port goes to a connector 38, enabling connection of a data unit as described previously and as is known in the art (such as to data unit 7*a* via wiring 16*a* in FIG. 1). The third port goes to a processing unit 36, integrated within outlet 30. Processing unit 36 provides the basic functionality of a data unit (such as data unit 7*a* of FIG. 1), and principally includes an address unit 37, with a stored address 39, that is unique within the network. For example, in an Ethernet network using interfaces 10BaseT or 100BaseTX according to IEEE802.3, the processing unit 36 may include a MAC (Media Access Control) address or an IP (Internet Protocol) address, as the address 39. In this manner, outlet 30 becomes an addressable entity within the network, and is able to respond to messages carrying address 39, or to transmit messages containing address 39 as a source. Because the outlet 30 is an addressable entity in the network, it is possible to execute remote diagnostics to determine the status and health of the outlet 30. For example, a message calling for a reply can be sent to the outlet 30. Receiving an answer from such an outlet confirms the existence of the outlet in the network, as well as the basic functionality of the outlet and any connections to the outlet via which the answer is received. Furthermore, one or more status devices may be integrated in the outlet and addressed either individually or as a group, to providing meaningful data about the outlet status and the condition of the network in general. Typical status devices are voltage sensors, continuity detectors, hub activity indicators, transducers etc. Network condition includes, but is not limited to, such factors as continuity of wiring, connector status, connected devices, topology, signal delays, latencies, and routing patterns. Although the outlet 30 has been described above as having a single data networking interface 38, multiple interfaces can be supported, each connected to a different port of hub 11. Processing unit 36 may also be capable of analyzing received messages, in order to perform actions in response thereto, as well as composing messages for sending, in order to respond to received messages, or to initiate messages to other devices on the network. For example, processing unit 36 may detect an abnormal condition or emergency situation, and may therefore notify other devices on the network via messages.

Managed devices such as managed hub, managed switch and router are known in the art. Outlet 30 may be viewed as a managed device housed within an outlet.

Figure 4:
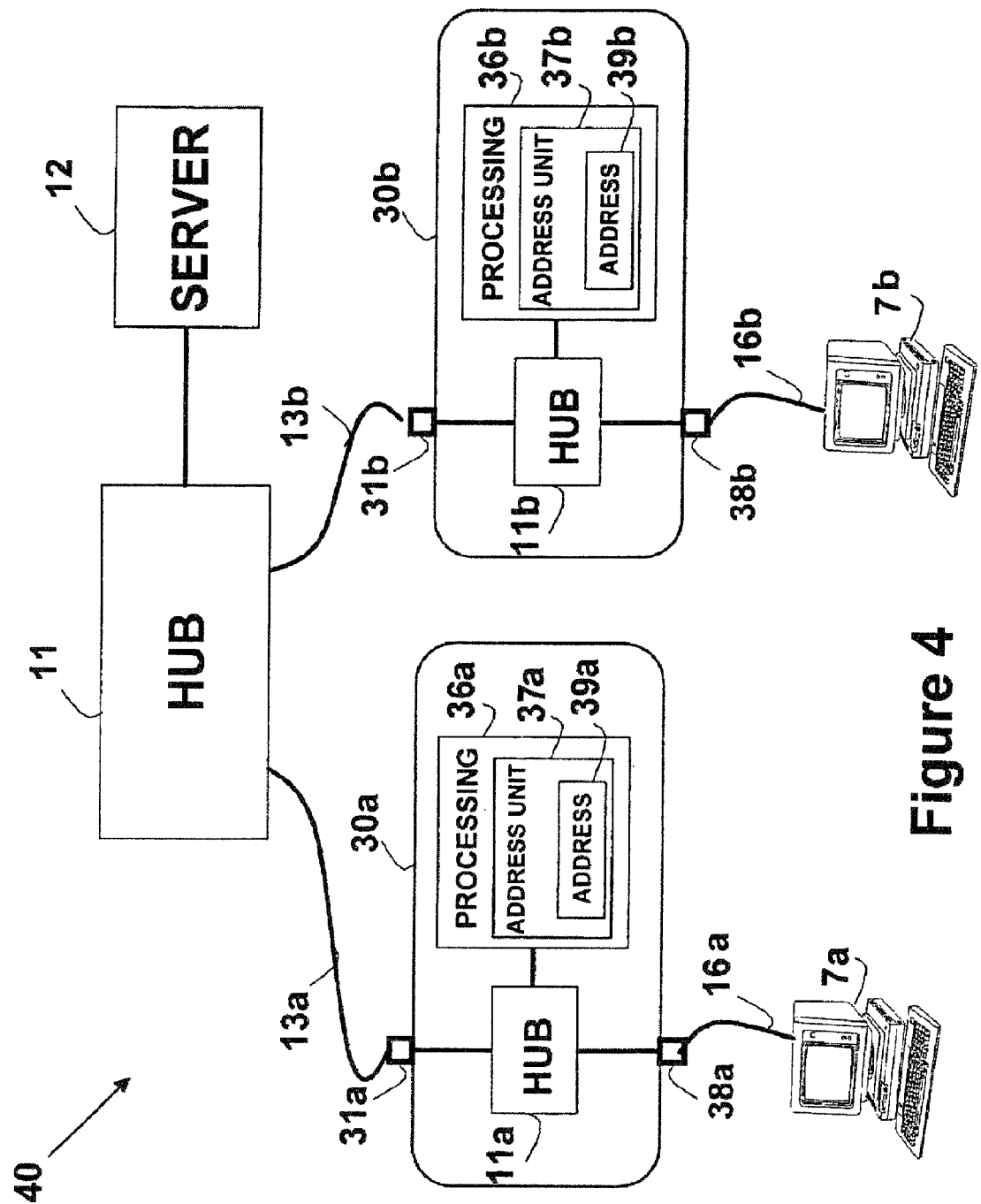
FIG. 4 shows a local area network according to the present invention.

FIG. 4 shows a Local Area Network (LAN) 40 according to the present invention. Basically, the infrastructure of network 40 is the same as that of prior art network 10 (FIG. 1), in which hub 11 is connected in a 'star' topology to various end units via network wiring 13*a* and 13*b*, which are connected respectively to outlets 15*a* and 15*b* (in FIG. 1). However, according to the present invention, outlets 15*a* and 15*b* of prior-art network 10 are replaced by outlets 30*a* and 30*b*, respectively, which contain addressable processing units 36*a* and 36*b*, as previously described with reference to FIG. 3. For example, outlet 30*a* has built-in processing unit 36*a*, addressing unit 37*a*, and address 39*a*. Outlet 30*a* allows for connection of data unit 7*a* via a connector 38*a* using wiring 16*a*. Similarly, outlet 30*b* allows data unit 7*b* to be connected to the network via wiring 16*b* to a connector 38*b*. Addressing units 37*a* and 37*b* integrated within outlets 30*a* and 30*b*, respectively, allow for unique identification of outlets 30*a* and 30*b* by addresses 39*a* and 39*b*, respectively.

Network 40 offers the advantages of being able to individually address each outlet, hence allowing remote diagnostics. The outlets 30*a* and 30*b* of network 40 can now facilitate fault localization. For example, the server 12 will transmit a message to outlet 30*a*, using outlet 30*a* address, followed by a message to data unit 7*a*. In the case wherein outlet 30*a* responds to the server 12 and data unit 7*a* does not respond, the most probable scenario is that the connection between the data unit and outlet 30*a* is faulty or no data unit is connected to outlet 30*a*. Hence, assuming data unit 7*a* is connected, the fault is easily limited only to connector 38*a*, wiring 16*a* or data unit 7*a*. Similarly, in the case wherein no reply is received from outlet 30*a*, the fault is localized to cable 13*a*, connector 31*a* or outlet 30*a*.

Powering the outlet 30 can be implemented either locally, by connecting a power supply to each outlet, or, preferably, via the network itself. In the latter case, commonly known as "Power over LAN", the power can be carried to the outlet from a central location either by an additional wire pair, using the well-known phantom configuration, or by the FDM (Frequency Division/Domain Multiplexing) method. The latter commonly employs DC feeding, which is frequency-isolated from the data carried in the higher part of the spectrum.

Figure 5:
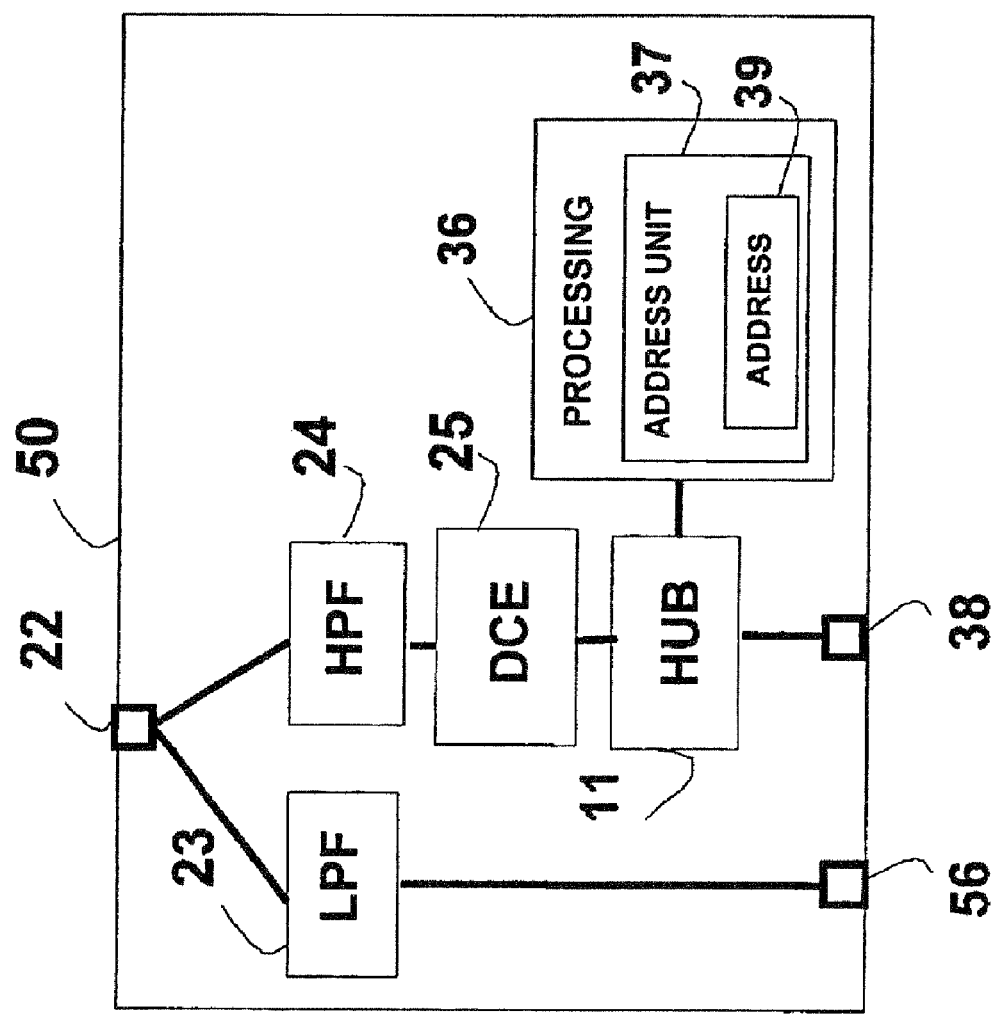
FIG. 5 shows a local area network over telephone lines outlet according to the present invention.

In another embodiment, the present invention is used in a data network over in-building telephone lines, where analog telephony signals are carried in the low-frequency portion of the spectrum, and data communication signals are carried in the high-frequency portion. FIG. 5 shows an outlet 50 according the present invention, which is able to separate and combine signals in different portions of the spectrum. Outlet 50 connects to the telephone wiring via a connector 22, preferably located at the rear part of outlet 50, where outlet 50 mechanically mounts to an interior wall of the building. A Low Pass Filter (LPF) 23 isolates the analog telephony part of the spectrum for connection to an analog telephone via a jack 56. Jack 56 is preferably a standard telephone jack, such as RJ-11 in North-America. Data communication signals are isolated by a High Pass Filter (HPF) 24, which connects to a Data Communications Equipment (DCE) unit 25, which serves as a modem for data communications over the telephone line media. An integrated hub 11 allows sharing data between processing unit 36, including address unit 37 with address 39, and a data jack 38, for connecting external devices to the network via DCE unit 25. Processing unit 36 with integrated address unit 37 allows messages directed to or from the outlet to be uniquely routed. Outlet 50 supports both standard analog telephony (via jack 56) as well as data communications via jack 38.

Figure 6:
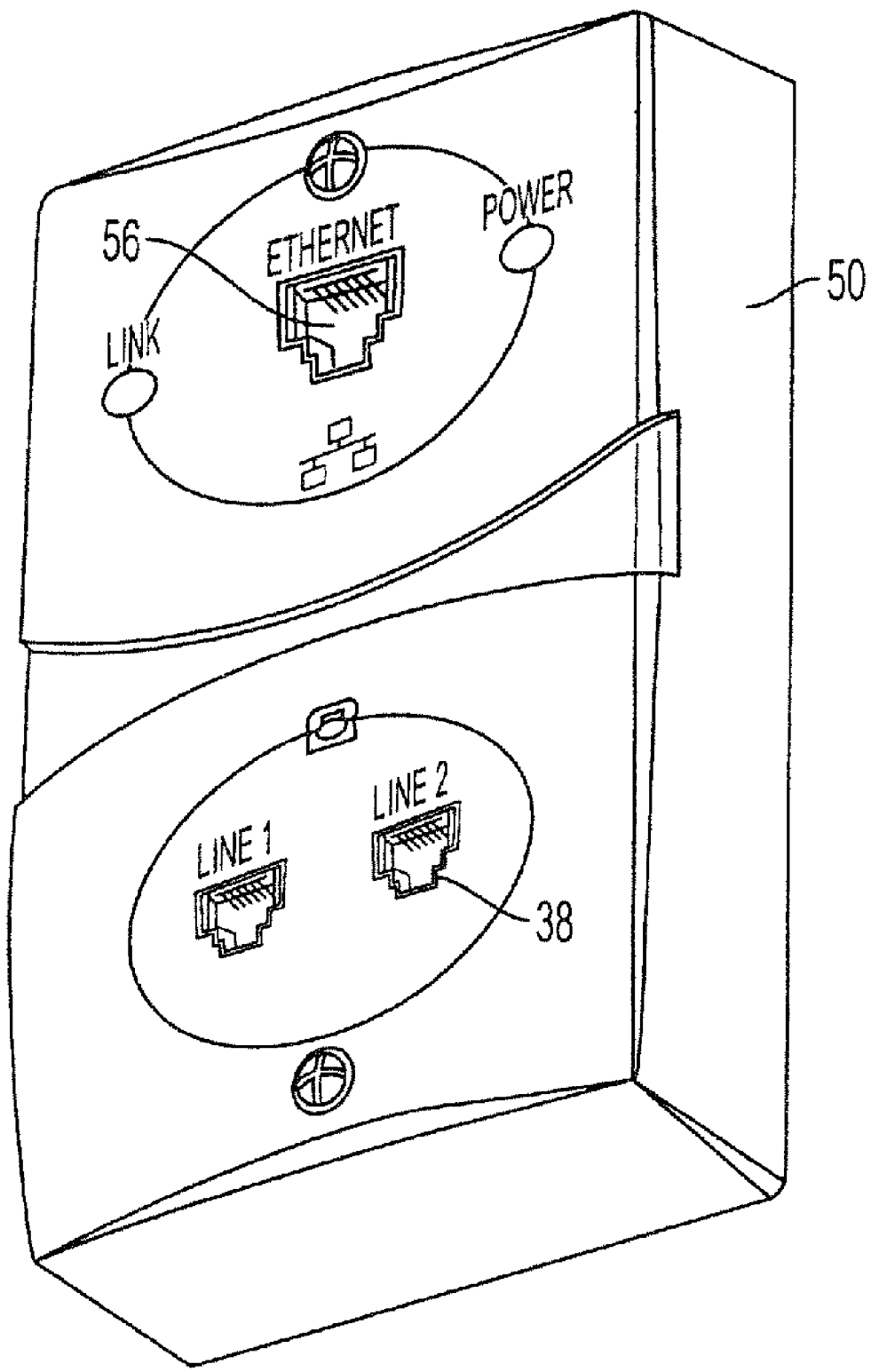
FIG. 6 illustrates the front panel of a telephone outlet according to the present invention.

FIG. 6 pictorially illustrates the front panel of a telephone outlet 50 according to the present invention, having both telephony connector 56 and data connector 38.

Figure 7:
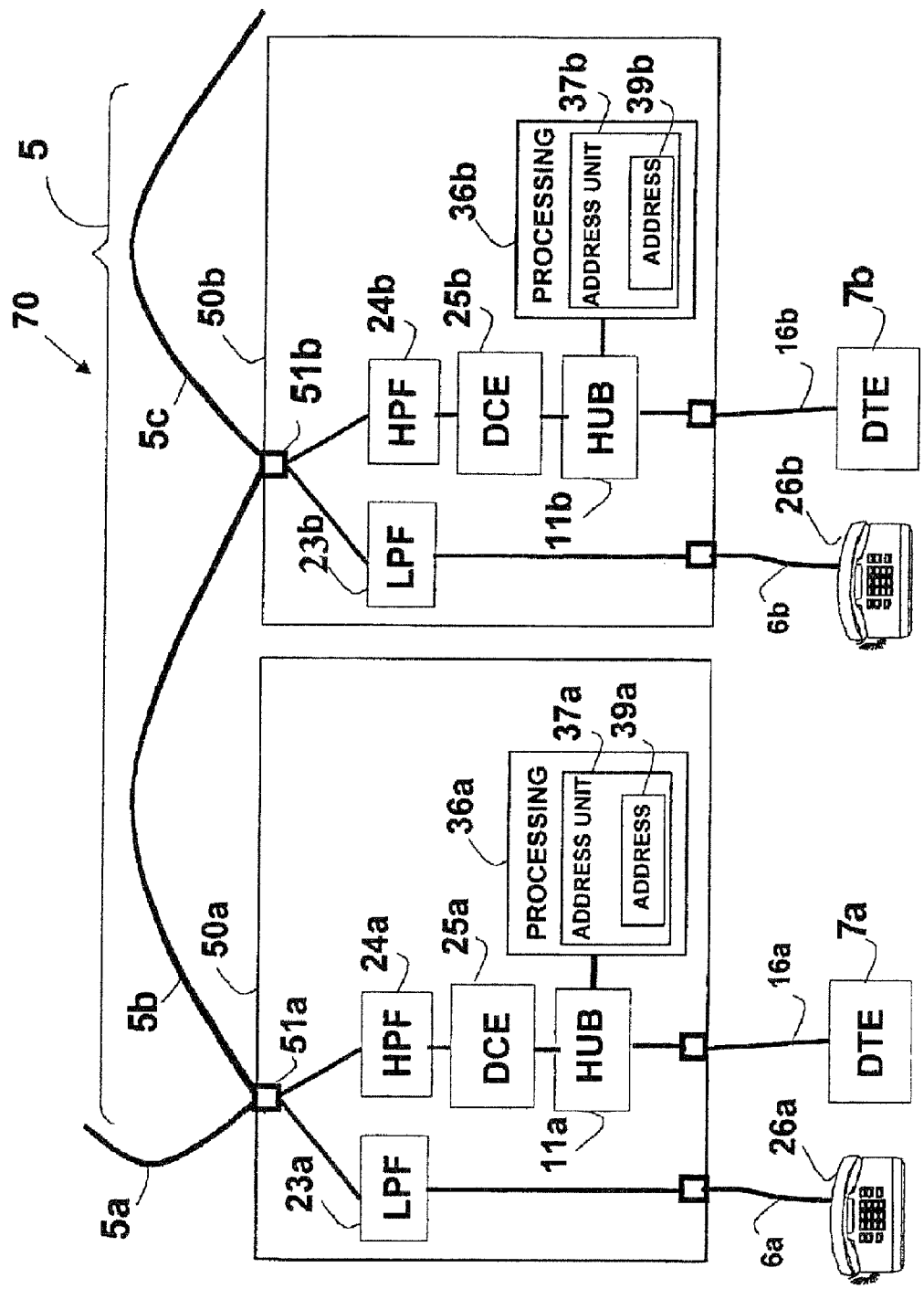
FIG. 7 shows a local area network over telephone lines according to the present invention.

FIG. 7 illustrates a network 70 that operates over telephone lines 5*a*, 5*b*, and 5*c*, and employs outlets 50*a* and 50*b* according to the present invention. Network 70 supports regular PSTN telephony service via analog telephone sets 26*a* and 26*b*, connected to the telephone connectors of outlets 50*a* and 50*b* respectively. Simultaneously, data networking can be accomplished by data units 7*a* and 7*b*. Outlets 50*a* and 50*b* can each be addressed by any other outlet or data unit in the network using dedicated addresses 39*a* and 39*b*, conveyed by address units 37*a* and 37*b*, respectively. Similarly, outlets 50*a* and 50*b* can address any other entity in the network, and as such both the outlets and the various network segments can be fault isolated as described above.

Figure 8:
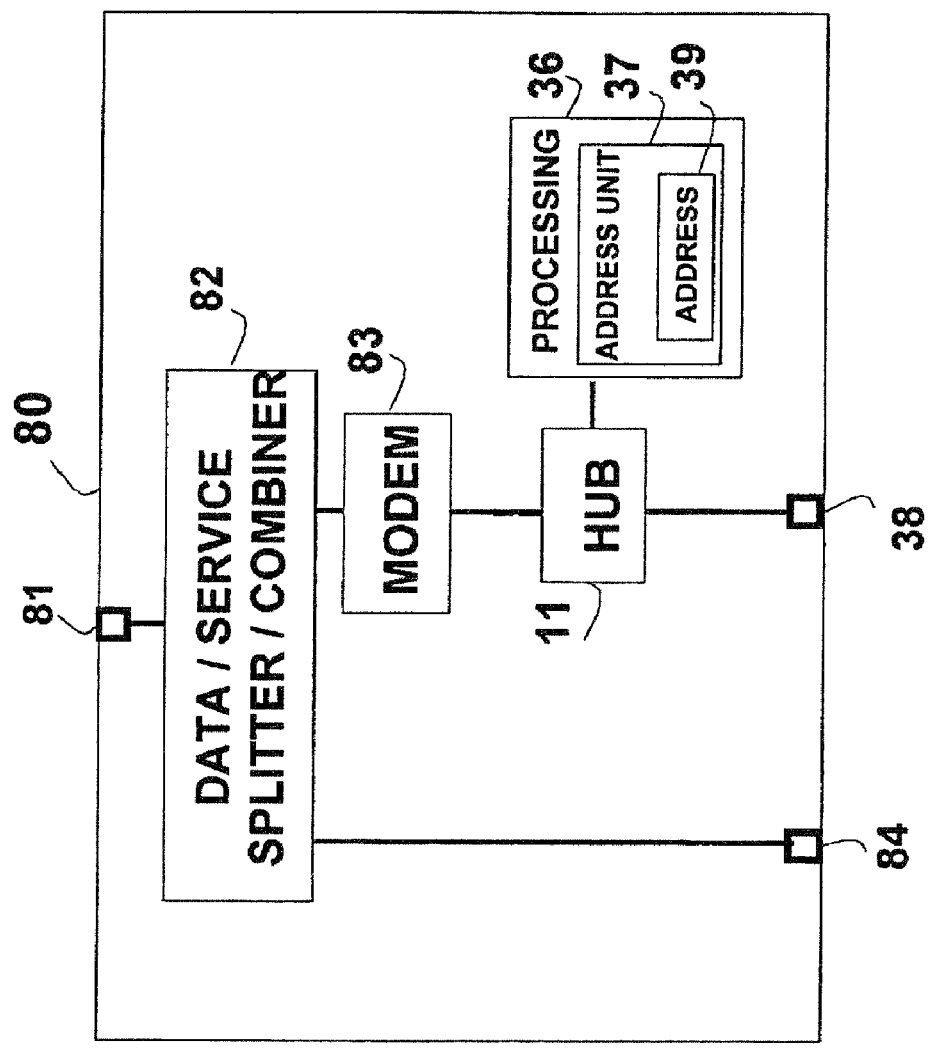
FIG. 8 illustrates a general form of an outlet according to the present invention, which can serve in various wired network environments, such as CATV and electrical power networks.

Although the invention has been so far demonstrated as relating to telephone wiring and telephone outlets, the invention can be similarly applied to any type of wired networking within a building, such as CATV or electrical power wiring. FIG. 8 illustrates an outlet 80, which is a general embodiment of the present invention. Outlet 80 is similar in overall layout to the outlet 50 shown in FIG. 5. Outlet 80 connects to the relevant wiring via a connector 81 and contains an integrated data/service splitter/combiner unit 82, which isolates the data carried over the wiring from the main service signal. In the case of telephony, unit 82 contains a low-pass filter (such as LPF 23*a* as shown in FIG. 7) and a high-pass filter (such as HPF 24*a* as shown in FIG. 7). In the case of electrical power wiring, the AC power is split by unit 82 and fed to a socket 84, for supplying electrical power as is normal for such an outlet. In this case, a modem 83 being a power-line carrier (PLC) modem interfaces the hub 11 to the integrated data/service splitter/combiner unit 82 to allow data communication over the power line. Similarly, in the case of a CATV application, where the CATV wiring is used for the network infrastructure, modem 83 is a coaxial cable modem, and unit 82 isolates the CATV signal from the data signal.

Although the invention has been so far described as relating to Ethernet/IP-based data networks, the invention can be similarly applied to any type of data network. Furthermore, although packet networks are the most common for local area networks, the invention is not restricted to packet networks only, and can be applied to any digital data network, where network entities are identified uniquely by addresses.

Furthermore, although the invention has been described as relating to networks based on continuous electrical conducting media (telephone, CATV, or electrical power), and the relevant modem and associated circuitry are connected in parallel to the wiring infrastructure, the invention can be applied equally to the case wherein the wiring is not continuous, but is in discrete segments. Such an arrangement is disclosed in WO 0007322 published Feb. 10, 2000 and entitled "Local Area Network of Serial Intelligent Cells" in the name of the present inventor and assigned to the present assignee.

Although outlets 30, 50 and 80 are each described above as having a single data connection, it is to be understood that multiple data network interfaces can be included within an outlet, each connected to different port of the respective hub (such as hub 11*a*, as shown in FIG. 7).

In addition, although the present invention has been described with respect to a single address associated with each outlet, it will be appreciated that multiple addresses can also be assigned to an outlet. Different addresses can be associated with different data ports and/or with different functionalities of the outlet thus improving fault isolation by separately addressing the addressable data ports or functionalities until an absence of a response signal to a diagnostic message indicates that the addressed port and/or functionality of the outlet is faulty or that there is a break in the connection path thereto.

Figure 9:
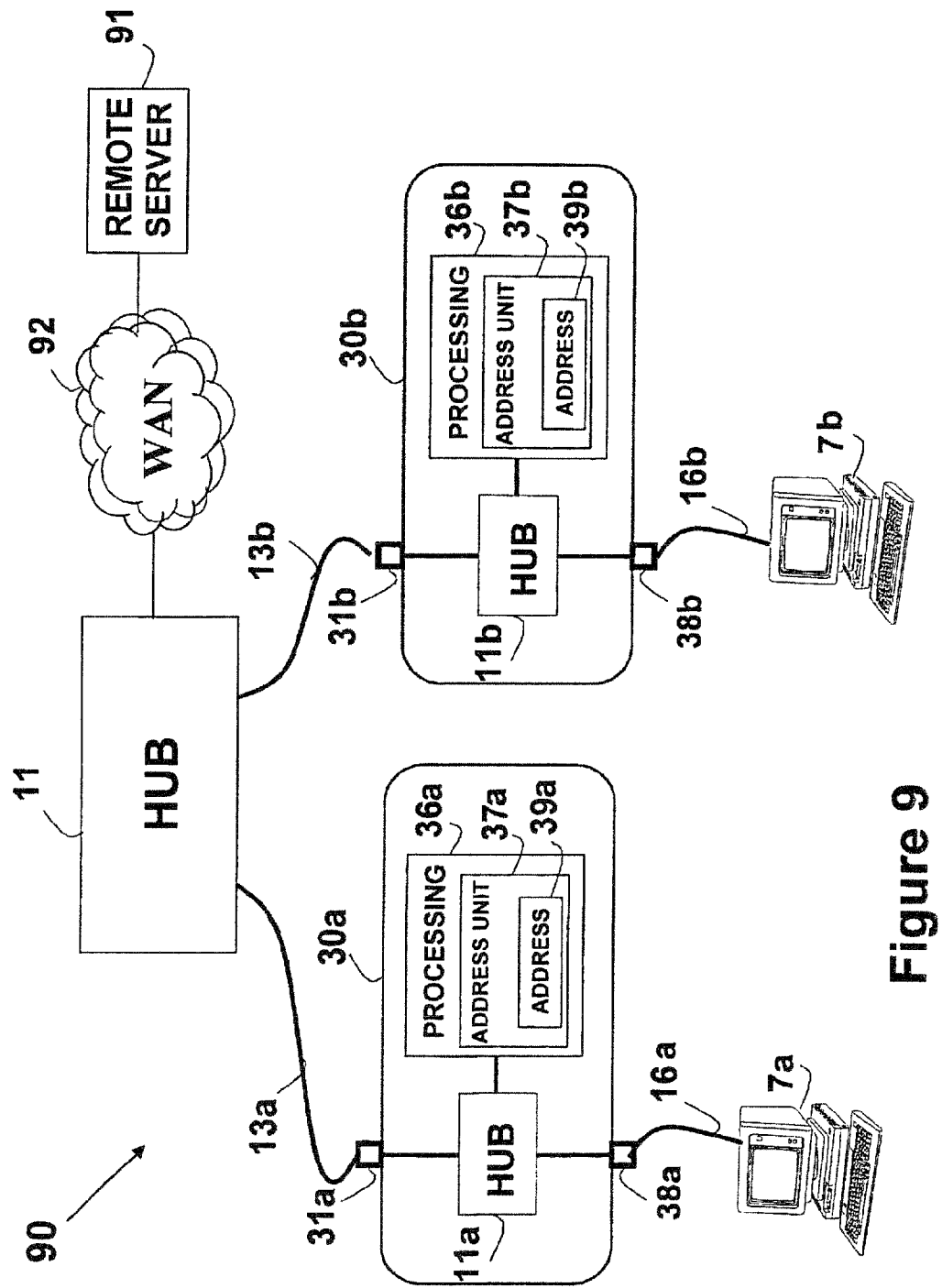
FIG. 9 shows a remote-managed local area network according to the present invention.

While the invention has been described with regard to local area networks, wherein the fault is localized locally, it will be appreciated that assigning addresses to outlets facilitates also remote diagnostics and fault localization. Such a network 90 is described in FIG. 9. Network 90 comprises local area network part similar to network 40 above (Phoneline, CATV or powerline based networks can equally be used). However, an external connection is added to an external network 92. The connection makes use of a gateway 93, bridging between the external WAN and the internal LAN, commonly known as Integrated Access Device (IAD), Home or Residential Gateway (RG). For example, the external network can be a Wide Area Network (WAN), either wired or non-wired. For example, the external network 92 can be the Internet. The connection can be via different access technologies such as xDSL (using xDSL modem), CATV based (using Cable Modem or Set Top Box) or wireless (satellite or terrestrial). A remote server 91 is a data unit connected remotely to the WAN 92, and hence can communicate with the local area network and its components, data units 7*a*, 7*b* and outlets 30*a* and 30*b*. In such an arrangement, fault isolation can be performed remotely, managed by the server 91. By communicating with the outlets 30*a* and 30*b* and the data units 7*a* and 7*b*, the server 91 can determine the fault localization to a segment level as described above. Furthermore, the remote server 91 may check the system integrity up to the outlets level, even if no data units are connected or operative. In such a case, a Telco (through xDSL connection) or CATV provider (through Cable modem or set-top-box) can remotely test and verify the status of the network within a home.

What is claimed is:

1. A device for coupling data units to the Internet over wiring, the wiring being connected for carrying a digital data signal in a digital data frequency band that is distinct from, and higher than, the frequency of another signal, said device comprising:
   a connector consisting of one of an AC power plug and a telephone connector for connecting to the wiring;
   a modem for transmitting and receiving digital data over the wiring;
   a high pass filter coupled between said connector and said modem for substantially passing only signals in the digital data frequency band;
   a first data port for coupling to a first data unit;
   a first transceiver coupled to said first data port for bi-directional packet-based digital data communication with the first data unit;
   a second data port for coupling to a second data unit;
   a second transceiver coupled to said second data port for bi-directional packet-based digital data communication with the second data unit;
   a multiport interconnection circuit consisting of one of: a switch; a router; and a gateway, coupled to pass digital data between said modem and said first and second transceivers;
   a processor coupled to control and monitor said first and second transceivers and said modem;
   a first address unit coupled to said processor for storing a first address that uniquely identifies said device in a digital data network; and
   a single enclosure housing said connector, said modem, said high pass filter, said first and second data ports, said first and second transceivers, said multiport interconnection circuit, said processor and said first address unit.

2. The device according to claim 1,
   wherein: the wiring is AC power wiring adapted for further carrying an AC power signal at an AC power frequency; the another frequency is an AC power frequency; said connector is an AC power plug; and said modem is a powerline modem.

3. The device according to claim 2,
   wherein: the AC power wiring is connected to a telephone or CATV service provider; and communication over the AC power wiring is based on powerline carrier (PLC) standards.

4. The device according to claim 2, wherein the first address is one of an Internet Protocol (IP) address and a Media Access Control (MAC) address.

5. The device according to claim 1, further comprising a second address unit for storing a second address.

6. The device according to claim 5, wherein each of the first and second addresses is associated with a respective distinct functionality of said device.

7. The device according to claim 2, further comprising at least one sensor selected from the group consisting of: a voltage sensor, a continuity detector, a communication activity detector; and a connected device status detector, and wherein said sensor is coupled to said processor.

8. The device according to claim 7, further operative to send messages to a remote data unit over the AC power wiring, and wherein the messages include status information associated with said sensor.

9. The device according to claim 2, further connectable to the Internet via the AC power wiring, and wherein said device is remotely manageable by a remote data unit communicating with said device through the Internet.

10. The device according to claim 2, wherein the communication with the first data unit is a Local Area Network (LAN) communication over a wired medium and wherein said first data port is a first data connector.

11. The device according to claim 2, wherein the communication with the first data unit is point-to-point bi-directional packet-based serial digital data communication.

12. The device according to claim 11, wherein the communication with the first data unit is based on IEEE802.3, 10BaseT, or 100BaseT, and said first data connector is a RJ-45 jack.

13. The device according to claim 10, wherein the communication with each of the first and second data units is point-to-point bi-directional packet-based serial digital data communication.

14. The device according to claim 2, wherein said single enclosure is constructed to have at least one of the following:
 a form substantially similar to that of a standard AC power outlet;
 wall mounting elements substantially similar to those of a standard AC power wall outlet;
 a shape allowing direct mounting in an AC power outlet receptacle or opening; and
 a form to substitute for a standard AC power outlet.

15. The device according to claim 2, wherein said device is pluggable into and attachable to an AC power outlet.

16. The device according to claim 2, wherein said single enclosure is structured to attach to a mating fixture secured on a wall of the building.

17. The device according to claim 2, wherein said device is operative to compose and respond to messages associated with the first address over a LAN coupled to said device.

18. The device according to claim 2, wherein said device is operative to compose and respond to messages associated with the first address over a Wide Area Network (WAN) coupled to said device.

19. The device according to claim 2, further comprising a second address unit storing a second address, and wherein the first address is associated with said first data port and the second address is associated with said second data port.

20. The device according to claim 2, further operative for coupling the AC power signal to an AC powered appliance, and wherein said device further comprises an AC power jack housed in said single enclosure and coupled to said AC power plug for conducting the AC power signal to the AC powered appliance.

21. The device according to claim 2, wherein said device is in a building, the AC power wiring is at least in part in walls of the building, and said powerline modem is operative to communicate with another modem of the same type in the building.

22. The device according to claim 2, further operative for coupling the AC power signal to an AC powered appliance, t the AC power wiring being connected for concurrently carrying the AC power signal in the AC power frequency using frequency division multiplexing, said device further comprising:
 an AC power jack for connecting to the AC powered appliance to conduct the AC power signal to the AC powered appliance; and
 a low pass filter coupled between said AC power plug and said AC power jack for substantially passing only the AC power signal at the AC power frequency between the AC power wiring and the AC powered appliance.

23. The device according to claim 1, wherein: the wiring is a telephone wire pair; the another frequency is an analog telephone frequency within an analog telephone frequency band;
 said connector is a telephone connector; and said modem is a telephone line modem.

24. The device according to claim 23, further operative for coupling an analog telephone signal to an analog telephone set, the telephone wire pair being connected for concurrently carrying an analog telephone signal in the analog telephone frequency band using frequency division multiplexing, said device further comprising, in said single enclosure:
 a telephone jack for connecting to the analog telephone set to conduct the analog telephone signal to and from the analog telephone set; and
 a low pass filter coupled between said telephone connector and said telephone jack for substantially passing only signals in the analog telephone frequency band between the telephone wire pair and the analog telephone set.

25. The device according to claim 23, wherein: the telephone wire pair is connected to a telephone service provider; communication over the telephone wire pair is based on one of xDSL and ADSL standards; and said telephone line modem is respectively an xDSL or ADSL modem.

26. The device according to claim 23, wherein the first address is one of an Internet Protocol (IP) address and a Media Access Control (MAC) address.

27. The device according to claim 23, further comprising a second address unit for storing a second address.

28. The device according to claim 27, wherein each of the first and second addresses is associated with a respective distinct functionality of said device.

29. The device according to claim 23, further comprising at least one sensor selected from the group consisting of: a voltage sensor, a continuity detector, a communication activity detector; and a connected device status detector, and wherein said sensor is coupled to said processor.

30. The device according to claim 29, further operative to send messages to a remote data unit over the telephone wire pair, and wherein the messages include status information associated with said sensor.

31. The device according to claim 23, further connectable to the Internet via the telephone wire pair, and wherein said device is remotely manageable by a remote data unit communicating with said device through the Internet.

32. The device according to claim 23, wherein the communication with the first data unit is a Local Area Network (LAN) communication over a wired medium and wherein said first data port is a first data connector.

33. The device according to claim 32, wherein the communication with the first data unit is point-to-point bidirectional packet-based serial digital data communication.

34. The device according to claim 33, wherein the communication with the first data unit is based on IEEE802.3 10BaseT or 100BaseT, and said first data connector is a RJ-45 jack.

35. The device according to claim 32 wherein the communication with each of the first and second data units is point-to-point bi-directional packet-based serial digital data communication.

36. The device according to claim 23, wherein said single enclosure is constructed to have at least one of the following:
 a form substantially similar to that of a standard telephone outlet;
 wall mounting elements substantially similar to those of a standard telephone wall outlet;

a shape allowing direct mounting in a telephone outlet receptacle or opening; and a form to substitute for a standard telephone outlet.

37. The device according to claim 23, wherein said device is operative to compose and respond to messages associated with the first address over a LAN coupled to said device.

38. The device according to claim 23, wherein said device is operative to compose and respond to messages associated with the first address over a Wide Area Network (WAN) coupled to said device.

39. The device according to claim 23, further comprising a second address unit storing a second address, and wherein the first address is associated with said first data port and the second address is associated with said second data port.

40. The device according to claim 23, further operative for coupling an analog telephone signal to an analog telephone set, and wherein said device further comprises a telephone jack housed in said single enclosure and coupled to said telephone connector for conducting the analog telephone signal to and from the analog telephone set.

41. The device according to claim 23, wherein said device is in a building, the telephone wire pair is at least in part in walls of the building, and said telephone line modem is operative to communicate with another modem of the same type in the building.

42. A wall-mountable device for coupling a data unit in a building to the Internet over AC power wiring, the AC power wiring being connected for carrying an AC power signal at an AC power frequency and a digital data signal in a digital data frequency band that is distinct from the AC power frequency, said device comprising:

an AC power plug for connecting to the AC power wiring;

a powerline modem for transmitting and receiving digital data over the AC power wiring;

a high pass filter coupled between said AC power plug and said powerline modem for substantially passing only signals in the digital data frequency band;

a first data port for coupling to a first data unit;

a first transceiver coupled between said powerline modem and said first data port for bi-directional packet-based digital data communication with the first data unit;

a processor coupled to control and monitor said first transceiver and said powerline modem;

a first address unit coupled to said processor for storing a first address that uniquely identifies said device in a digital data network; and a single enclosure housing said AC power plug, said powerline modem, said high pass filter, said first data port, said first transceiver, said processor and said first address unit, wherein said single enclosure is mountable onto an AC power outlet opening.

43. The device according to claim 42, further operative for coupling the AC power signal to an AC powered appliance, the AC power wiring being connected for concurrently carrying the AC power signal at the AC power frequency using frequency division multiplexing, said device further comprising:

an AC power jack for connecting to the AC powered appliance to conduct the AC power signal to the AC powered appliance; and a low pass filter coupled between said AC power plug and said AC power jack for substantially passing only signals at the AC power frequency between the AC power wiring and the AC powered appliance.

44. The device according to claim 42, further comprising, in said single enclosure:

a second data port for coupling to a second data unit;

a second transceiver coupled to said second data port for bi-directional packet-based digital data communication with the second data unit; and a multiport interconnection circuit consisting of one of: a switch; a router; and a gateway, coupled to pass digital data between said powerline modem and said first and second transceivers.

45. The device according to claim 44, wherein the communication with each of the first and second data units is point-to-point bi-directional packet-based serial digital data communication.

46. The device according to claim 44, further comprising a second address unit for storing a second address, and wherein the first address is associated with said first data port and the second address is associated with said second data port.

47. The device according to claim 42, wherein: the AC power wiring is connected to a telephone or CATV service provider; and communication over the AC power wiring is based on a powerline carrier (PLC) standard.

48. The device according to claim 42, wherein the first address is one of an Internet Protocol (IP) address and a Media Access Control (MAC) address.

49. The device according to claim 42, further comprising a second address unit for storing a second address.

50. The device according to claim 49, wherein each of the first and second addresses is associated with a respective distinct functionality of said device.

51. The device according to claim 42, further comprising at least one sensor selected from the group consisting of: a voltage sensor, a continuity detector, a communication activity detector; and a connected device status detector, and wherein said sensor is coupled to said processor.

52. The device according to claim 51, further operative to send messages to a remote data unit over the AC power wiring, and wherein the messages include status information associated with said sensor.

53. The device according to claim 42, further connectable to the Internet via the AC power wiring, and wherein said device is remotely manageable by a remote data unit connected to said device through the Internet.

54. The device according to claim 42, wherein the communication with the first data unit is a Local Area Network (LAN) communication over a wired medium, and wherein said first data port is a first data connector.

55. The device according to claim 54, wherein the communication with the first data unit is point-to-point bi-directional packet-based serial digital data communication.

56. The device according to claim 55, wherein the communication with the first data unit is based on IEEE802.3, 10BaseT, or 100BaseT, and said first data connector is a RJ-45 jack.

57. The device according to claim 42, wherein said single enclosure is constructed to have at least one of the following:

a form substantially similar to that of a standard AC power outlet;

wall mounting elements substantially similar to those of a standard AC power wall outlet;

a shape allowing direct mounting in an AC power outlet receptacle or opening; and a form to at least in part substitute for a standard AC power outlet.

58. The device according to claim 42, wherein said device is pluggable into and attachable to an AC power outlet.

59. The device according to claim 42, wherein said single enclosure is structured to attach to a mating fixture secured on a wall of a building.

60. The device according to claim 42, wherein said device is operative to compose and respond to messages associated with the first address over a LAN coupled to said device.

61. The device according to claim 42, wherein said device is operative to compose and respond to messages associated with the first address over a Wide Area Network (WAN) coupled to said device.

62. The device according to claim 42, further operative for coupling an AC power signal to an AC powered appliance, wherein said device further comprises an AC power jack housed in said single enclosure and coupled to said AC power plug for coupling an AC power signal to the AC powered appliance.

63. The device according to claim 42, wherein said device is in a building, the AC power wiring is at least in part in walls of the building, and said powerline modem is operative to communicate with another modem of the same type in the building.

* * * * *